United States Patent [19]
Katz et al.

[11] Patent Number: 5,650,130
[45] Date of Patent: *Jul. 22, 1997

[54] COUNTERFLOW DIFFUSION FLAME SYNTHESIS OF CERAMIC OXIDE POWDERS

[75] Inventors: Joseph L. Katz, Baltimore; Philippe F. Miquel, Towson, both of Md.

[73] Assignee: The Johns Hopkins University, Baltimore, Md.

[*] Notice: The term of this patent shall not extend beyond the expiration date of Pat. No. 5,268,337.

[21] Appl. No.: 466,787

[22] Filed: Jun. 6, 1995

Related U.S. Application Data

[60] Continuation-in-part of Ser. No. 104,538, Aug. 11, 1993, which is a division of Ser. No. 793,569, Nov. 18, 1991, Pat. No. 5,268,337.

[51] Int. Cl.⁶ .............................. C04B 35/01; C01B 13/00
[52] U.S. Cl. .............................. 423/593; 423/592; 501/1; 501/94; 264/12; 264/121; 264/122; 419/1
[58] Field of Search .......................... 501/94, 1; 419/1; 423/337, 494, 495, 612, 618, 625, 593, 592; 264/12, 121, 122

[56] References Cited

U.S. PATENT DOCUMENTS

| | | |
|---|---|---|
| 3,373,119 | 3/1968 | Krystyniak . |
| 3,617,358 | 11/1971 | Dittrich . |
| 4,367,919 | 1/1983 | Tung et al. . |
| 4,508,667 | 4/1985 | Elliott . |
| 4,564,556 | 1/1986 | Lange . |
| 4,605,591 | 8/1986 | Owens et al. . |
| 4,772,511 | 9/1988 | Wood et al. . |
| 5,268,337 | 12/1993 | Katz et al. .............. 501/94 |

FOREIGN PATENT DOCUMENTS 0133916  3/1985  European Pat. Off. .

OTHER PUBLICATIONS

P.F. Miquel et al., "Flame synthesis of nanostructured vanadium oxide based catalysts," 1995 Elsevier Science B.V., pp. 207–216 (no month).

J.L. Katz et al., "Formation of Nanostructured $V_2O_5$–Based Catalysts in Flames," Syposium on Advanced Techniques in Catalyst Preparation, vol. 40, No. 1, Feb. 1995, pp. 40–43.

J.L. Katz et al., "Syntheses and Applications of Oxides and Mixed Oxides Produced by a Flame Process," NanoStructured Materials, vol. 4, No. 5, pp. 551–557, 1994 (no month).

P.F. Miquel et al., "Formation of $V_2O_5$–based mixed oxides in flames," J. Mater. Res., vol. 8, No. 9, Sep. 1993, pp. 2404–2413.

P.F. Miquel et al., "Formation and characterization of nanostructured V—P—O particles in flames: A new route for the formation of catalysts," J. Mater. Res., vol. 9, No. 3, Mar. 1994, pp. 746–754.

C.H. Hung et al., "Formation of mixed oxide powders in flames: Part II. $SiO_2$–$GeO_2$ and $Al_2O_3$–$TiO_2$," J. Mater. Res., vol. 7, No. 7, Jul. 1992, pp. 1870–1875.

C.H. Hung et al., "Formation of mixed oxide powders in flames: Part I. $TiO_2$–$SiO_2$," J. Mater. Res., vol. 7, No. 7, Jul. 1992, pp. 1861–1869.

*Primary Examiner*—Michael Marcheschi
*Attorney, Agent, or Firm*—Cushman Darby & Cushman IP Group of Pillsbury Madison & Sutro, LLP

[57] ABSTRACT

Ceramic oxide powders and methods for their preparation are revealed. Ceramic oxide powders are obtained using a flame process whereby one or more precursors of ceramic oxides are introduced into a counterflow diffusion flame burner wherein the precursors are converted into ceramic oxide powders. The nature of the ceramic oxide powder produced is determined by process conditions. The morphology, particle size, and crystalline form of the ceramic oxide powders may be varied by the temperature of the flame, the precursor concentration ratio, the gas stream and the gas velocity.

10 Claims, 23 Drawing Sheets

Increasing Residence Time and Increasing Temperature ⟶

Increasing Residence Time and Increasing Temperature →

| | Step I | Step II | Step III | Step IV | Step V |
|---|---|---|---|---|---|
| $SiO_2$-$GeO_2$ | $GeO_2$ particles | larger $GeO_2$ particles | $SiO_2$ condensed on $GeO_2$ | $GeO_2$ encapsulated by $SiO_2$ | particles of uniform composition |
| $Al_2O_3$-$TiO_2$ | $TiO_2$ and $Al_2O_3$ particles | chain-like structures | collapsed chains | surface growth or aggregation | particles of uniform composition |

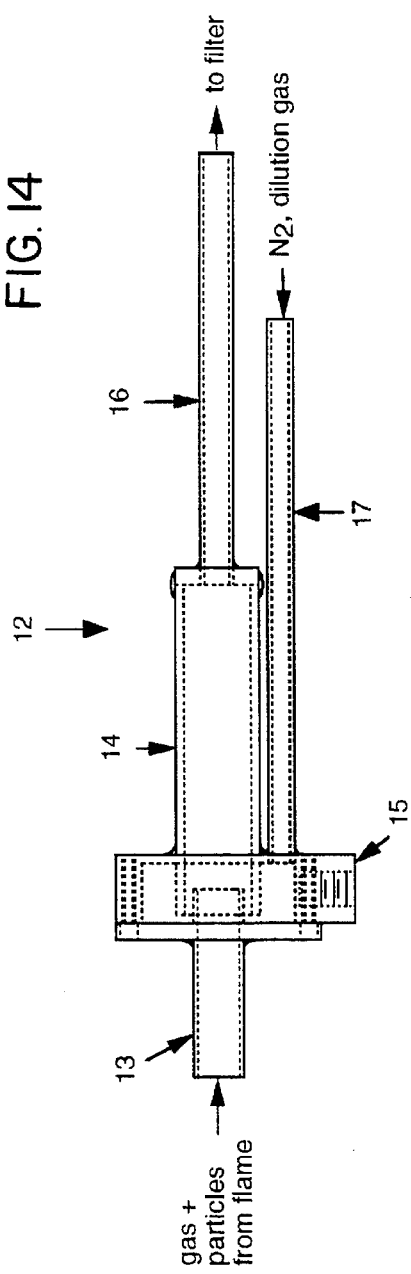
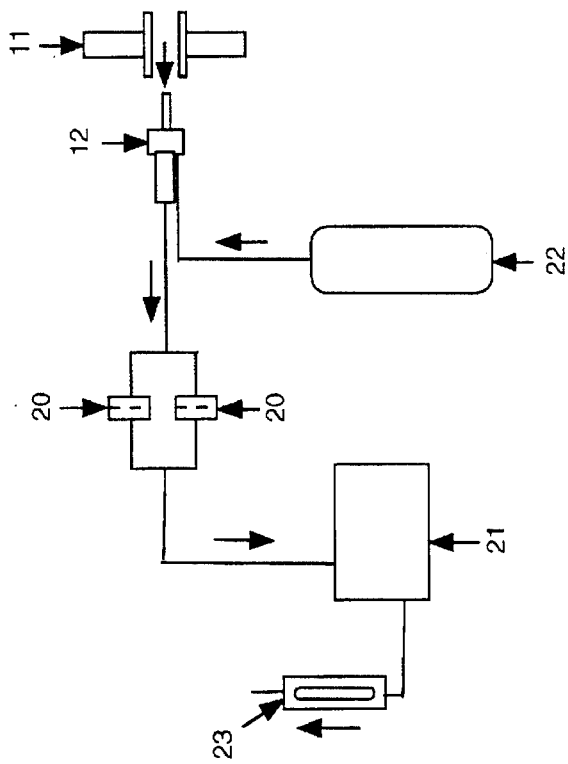
FIG. 14
FIG. 15

COUNTERFLOW DIFFUSION FLAME SYNTHESIS OF CERAMIC OXIDE POWDERS

This application is a continuation-in-part of U.S. patent application Ser. No. 08/104,538, filed Aug. 11, 1993, which is a divisional of U.S. patent application Ser. No. 07/793,569, filed Nov. 18, 1991, which issued as U.S. Pat. No. 5,268,337 on Dec. 7, 1993. The entire contents of U.S. patent application Ser. No. 08/104,538 and U.S. patent application Ser. No. 07/793,569 are hereby incorporated by reference and relied upon.

The invention disclosed and claimed herein was made in the course of research funded in part under Department of Energy Grant No. DE-FG02-88ER45356. The Government may have certain rights in the invention.

BACKGROUND OF THE INVENTION

This invention is broadly concerned with ceramic oxide powders and their method of preparation. More particularly, it is concerned with the formation of ceramic oxide powders obtained using a flame process and which have well characterized size distribution, shape, purity, morphology, and crystalline form.

Ceramic oxides and mixtures thereof find utility as catalysts, ceramics, optical fibers, pigments, and superconductors. More specifically, oxide powders such as $TiO_2$ (titania) and $SiO_2$ (silica) are used in industry to produce paint opacifiers, catalysts, catalyst supports, ceramic membranes, fiber optics, liquid thickeners, varistors, capacitors, etc. Successful manufacture of these products, however, depends on controlling the properties of the starting powders. The properties of the powder strongly depend on the method of powder synthesis. Most titania powder is produced using the chloride process.

Mixed ceramic oxide powders such as, for example, $SiO_2$—$Al_2O_3$, $Al_2O_3$—$TiO_2$, $TiO_2$—$V_2O_5$, $SiO_2$—$TiO_2$, $SiO_2$—$GeO_2$ and Y—Ba—Cu—O, are used to produce catalysts, catalyst supports, ceramics, optical fibers, pigments, and superconductors. The degree of mixing of these ceramic oxides and their microstructures are critical to their reactivity, strength, refractivity, and electrical resistivity.

Mixed ceramic oxides may be simple mixtures thereof, agglomerates, one ceramic oxide supported on another, or one ceramic oxide coated with another. The ceramic oxide may also be a compound formed from two different ceramic oxides, e.g., $Al_2O_3 \cdot TiO_2$. Mixed ceramic oxides are typically prepared by flame spraying mixed sols thereof or by coating a ceramic oxide by depositing it from a solution such as an aqueous silicate solution. These methods are characterized by difficulty in controlling the properties of the mixed ceramic oxide obtained.

SUMMARY OF THE INVENTION

Broadly, the present invention discloses ceramic oxide powders having well defined properties and processes for their preparation. More particularly, the invention is concerned with ceramic oxide powders having utility as catalysts, catalyst supports, optical fibers, ceramics, pigments, and superconductors, prepared using a counterflow diffusion flame burner. Thus, it is an object of this invention to provide ceramic oxide powders having well defined properties and a process for their production.

It is another object of this invention to provide ceramic oxide powders having utility as catalysts, catalyst supports, ceramics, optical fibers, pigments, and superconductors.

It is yet another object of this invention to provide powdered ceramic oxide compounds formed from one or more ceramic oxide precursors.

It is yet another object of this invention to provide powdered ceramic oxide compounds formed from two different ceramic oxide precursors.

It is still another object of this invention to provide ceramic oxide powders by means of a counterflow diffusion flame process.

Yet other objects will be apparent to those skilled in the art.

The foregoing and other objects are accomplished by the practice of this invention. Broadly, viewed in one of its principal aspects, this invention consists of a process for the formation of a ceramic oxide powder comprising the steps of:

a) introducing an oxidizing gas stream comprising $O_2$ and an inert gas into one end of a counterflow diffusion flame burner having a top end and a bottom end;

b) incorporating two ceramic oxide precursors into a fuel gas stream comprising a gaseous fuel and an inert gas;

c) introducing the fuel gas stream containing the ceramic oxide precursors into the other end of said counterflow diffusion flame burner; and d) generating a flame in the region of the counterflow diffusion flame burner where the two opposed gas streams impinge whereby the ceramic oxide precursors are converted to ceramic oxide powder.

A further aspect of this invention consists of a process for the formation of a ceramic oxide powder comprising the steps of:

a) introducing a fuel gas stream comprising a gaseous fuel and an inert gas into one end of a counterflow diffusion flame burner having a top end and a bottom end;

b) incorporating one or more ceramic oxide precursors into an oxidizing gas stream comprising $O_2$ and an inert gas, the ceramic oxide precursors being volatile metal compounds which upon combustion form ceramic oxide powder;

c) introducing the oxidizing gas stream containing one or more ceramic oxide precursors into the other end of the counterflow diffusion flame burner; and d) generating a flame in the region of the counterflow diffusion flame burner where the two opposed gas streams impinge whereby the ceramic oxide precursors are converted to ceramic oxide powder.

In another aspect, the present invention consists of a process for the formation of a ceramic oxide powder, comprising the steps of:

a) incorporating one or more ceramic oxide precursors into a fuel gas stream comprising a gaseous fuel and an inert gas, the ceramic oxide precursors being volatile metal compounds which upon combustion form ceramic oxide powder;

b) incorporating one or more ceramic oxide precursors into an oxidizing gas stream comprising $O_2$ and an inert gas, the ceramic oxide precursors being volatile metal compounds which upon combustion form ceramic oxide powder;

c) introducing the fuel gas stream containing one or more ceramic oxide precursors into one end of a counterflow diffusion flame burner having a top end and a bottom end;

d) introducing the oxidizing gas stream containing one or more ceramic oxide precursors into the other end of the counterflow diffusion flame burner; and e) generating a flame in the region of the counterflow diffusion flame burner where the two opposed gas streams impinge whereby the ceramic oxide precursors are converted to ceramic oxide powder.

In each of the above-described aspects, the inert gas may be selected from the group consisting of $N_2$, He, Ne, Ar, Kr, Xe, and mixtures thereof and the gaseous fuel may be selected from the group consisting of $H_2$, methane, ethane, ethylene, acetylene, and mixtures thereof.

The ceramic oxide powders of this invention are produced by the practice of the foregoing processes. Thus, one aspect of this invention consists of a ceramic oxide powder produced by the steps of:

a) introducing an oxidizing gas stream comprising $O_2$ and an inert gas into one end of a counterflow diffusion flame burner having a top end and a bottom end;

b) incorporating two ceramic oxide precursors into a fuel gas stream comprising a gaseous fuel and an inert gas;

c) introducing the fuel gas stream containing the ceramic oxide precursors into the other end of said counterflow diffusion flame burner; and d) generating a flame in the region of the counterflow diffusion flame burner where the two opposed gas streams impinge whereby the ceramic oxide precursors are converted to ceramic oxide powder.

A further aspect of this invention consists of a ceramic oxide powder produced by the steps of:

a) introducing a fuel gas stream comprising a gaseous fuel and an inert gas into one end of a counterflow diffusion flame burner having a top end and a bottom end;

b) incorporating one or more ceramic oxide precursors into an oxidizing gas stream comprising $O_2$ and an inert gas, the ceramic oxide precursors being volatile metal compounds which upon combustion form ceramic oxide powder;

c) introducing the oxidizing gas stream containing one or more ceramic oxide precursors into the other end of the counterflow diffusion flame burner; and d) generating a flame in the region of the counterflow diffusion flame burner where the two opposed gas streams impinge whereby the ceramic oxide precursors are converted to ceramic oxide powder.

In another aspect, the present invention consists of a ceramic oxide powder produced by the steps of:

a) incorporating one or more ceramic oxide precursors into a fuel gas stream comprising a gaseous fuel and an inert gas, the ceramic oxide precursors being volatile metal compounds which upon combustion form ceramic oxide powder;

b) incorporating one or more ceramic oxide precursors into an oxidizing gas stream comprising $O_2$ and an inert gas, the ceramic oxide precursors being volatile metal compounds which upon combustion form ceramic oxide powder;

c) introducing the fuel gas stream containing the ceramic oxide precursors into one end of a counterflow diffusion flame burner having a top end and a bottom end;

d) introducing the oxidizing gas stream containing the ceramic oxide precursors into the other end of the counterflow diffusion flame burner; and e) generating a flame in the region of the counterflow diffusion flame burner where the two opposed gas streams impinge whereby the ceramic oxide precursors are converted to ceramic oxide powder.

The instant invention thus provides ceramic oxide powders having a desired particle size, morphology, and crystalline form, and processes for their formation. More particularly, this invention provides ceramic oxide powders formed by a process wherein at least one ceramic oxide precursor is introduced into a counterflow diffusion flame burner whereby said precursor is converted to ceramic oxide powder.

The ceramic oxide powder thus produced may be, depending on reaction conditions, particles of one oxide form, particles of another oxide form or combination of oxide forms. If two ceramic oxide precursors are used, the resultant ceramic oxide powder may be, again depending on reaction conditions, small particles of one oxide adhering to larger particles of the other, uniform coating of one oxide onto particles of another, multicomponent particles of uniform composition, or compounds of the two ceramic oxides.

Depending on the composition, particle size, crystalline form, and morphology of the ceramic oxide, it may have utility as a ceramic, an optical fiber, a catalyst, a catalyst support, a pigment, or a paint opacifier. The nature and substance of the present invention as well as its objects and advantages will be more clearly perceived and fully understood by referring to the following description and claims taken in connection with the accompanying drawings which are described briefly below.

BRIEF DESCRIPTION OF THE DRAWINGS

FIG. 13 is a schematic of the particle growth processes for $SiO_2$—$GeO_2$ and for $Al_2O_3$—$TiO_2$.

FIG. 14 is a side view of the powder collector used to capture the ceramic oxide powders of the invention.

FIG. 15 is a schematic representation of the powder collection system used to capture the ceramic oxide powders produced in the counterflow diffusion flame burner.

DESCRIPTION OF THE PREFERRED EMBODIMENTS

The invention is concerned with ceramic oxide powders, formed from one or more ceramic oxide precursors, which have utility as ceramic oxides of high strength and low thermal expansion coefficient. The ceramic oxide powders are formed in a counterflow diffusion flame burner using a fuel stream comprising a gaseous fuel and an inert gas diluent, and an oxidizing gas stream comprising oxygen and an inert gas diluent. The gaseous fuel may be, for example, hydrogen, methane, ethane, ethylene, acetylene, or mixtures thereof. The preferred fuel is hydrogen. The inert gas in both the fuel stream and the oxidizing gas stream may be, for example, nitrogen, one of the rare gases such as helium, neon, argon, krypton, xenon, or mixtures thereof. A convenient oxidizing gas stream is air which essentially comprises oxygen and nitrogen.

The source materials, i.e., precursors, for the formation of ceramic oxide powders are, for example, $SiCl_4$, $AlCl_3$, $GeCl_4$, $TiCl_4$, $SiH_4$, $VOCl_3$, and $Al(CH_3)_3$. One or more precursors are injected into the flame simultaneously to form the ceramic oxide powder. Depending on reaction conditions, the product may be a pure ceramic oxide powder, a mixed ceramic oxide powder or a compound formed from two different ceramic oxides. Particle size, morphology, and crystalline form of the ceramic oxide powder may be varied by the choice of reaction conditions.

This invention is characterized by ceramic oxide powders having unique properties and a method for their preparation. More particularly, the invention is concerned with ceramic oxide powders formed by a flame process in a counterflow diffusion flame burner from at least one ceramic oxide precursor. By varying reaction conditions, it is possible to control particle size, morphology, and crystalline form of the ceramic oxide powders. The flame conditions, e.g., temperature and gas flow rate, and precursor concentration ratios are parameters which determine the ceramic oxide particle growth processes. A strong temperature dependence is apparent.

Counterflow Diffusion Flame Burner

Figure 1A:
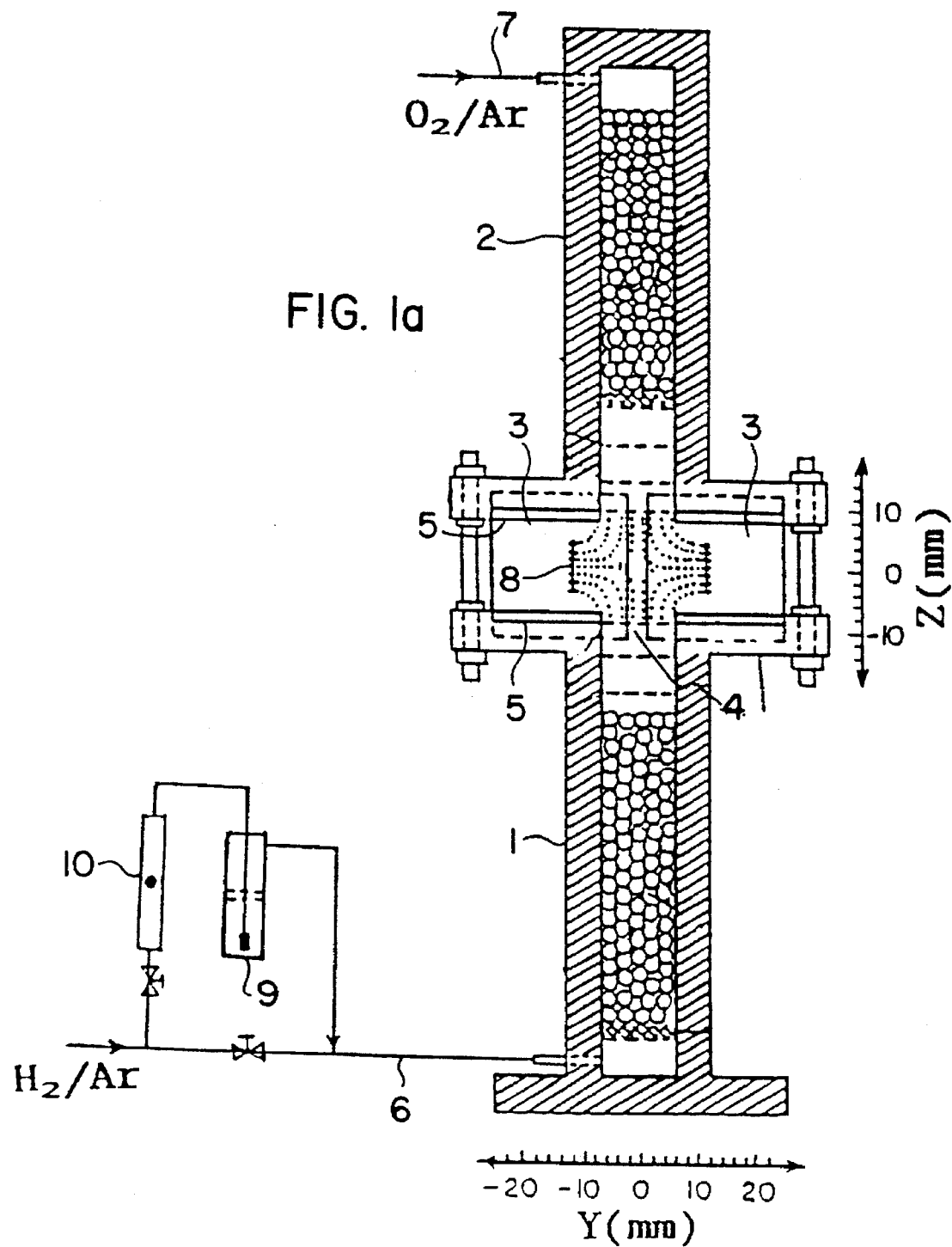
FIG. 1(a) is a side view of the rectangular counterflow diffusion flame burner used to produce the ceramic oxide powders of the invention.
Figure 1B:
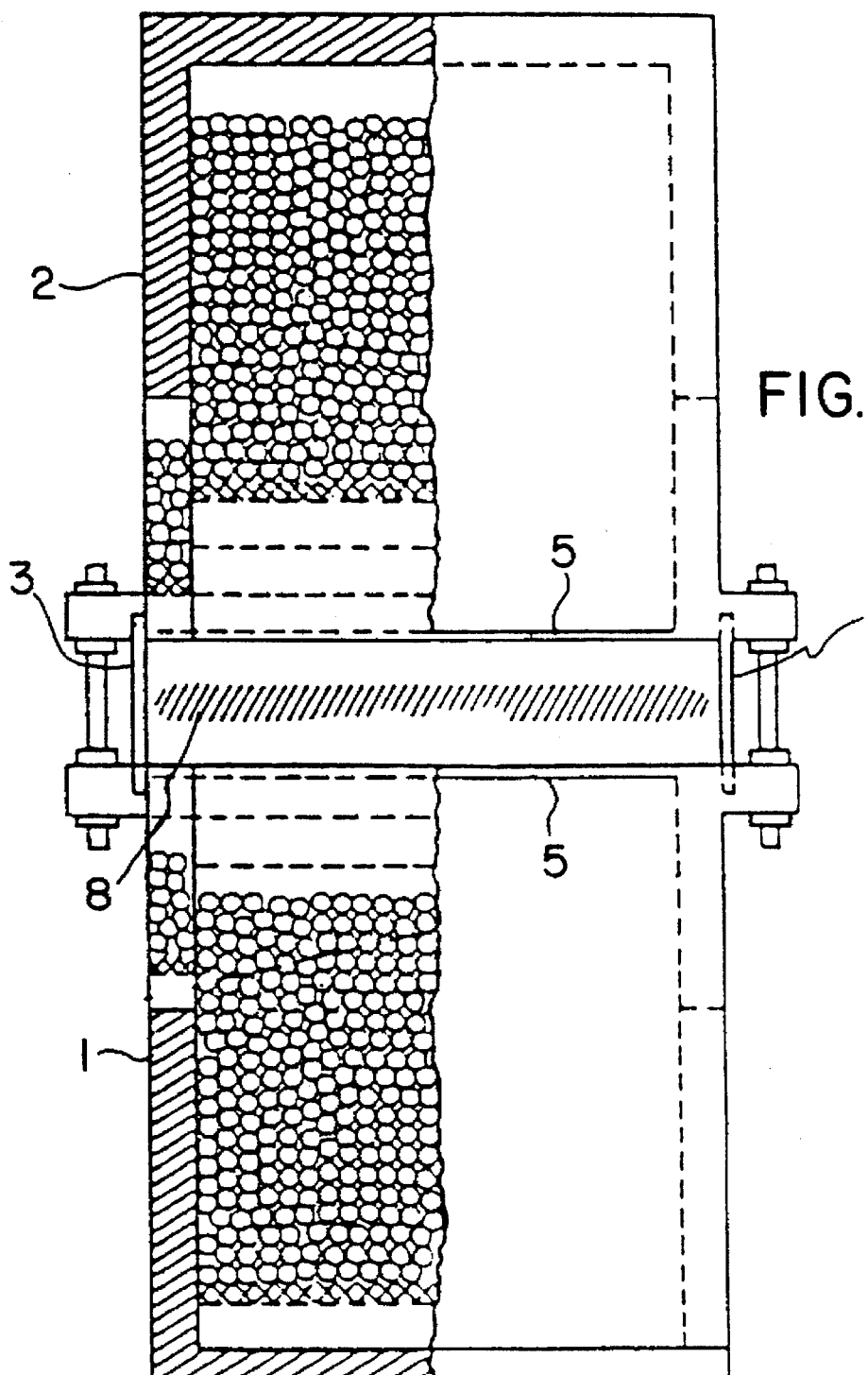
FIG. 1(b) is a front view of the rectangular counterflow diffusion flame burner used to produce the ceramic oxide powders of the invention.

FIG. 1(a) and FIG. 1(b) depict, respectively, cutaway side view and cutaway front view of the rectangular counterflow diffusion flame burner used in the practice of the invention. The burner consists of a lower vertical tube 1 and an upper vertical tube 2 of rectangular cross section separated by an adjustable distance of, for example, 15 mm. Each tube consists of three channels, a central main channel and two side channels. Two pairs of flat fused silica plates 3 connect the outsides of the two side channels of the two opposed tubes, thus forcing the combustion gases to flow out only through the front and back. A gap 4, e.g., 4 mm, between each pair of plates allows one to send light beams down the burner without significantly affecting the flow. Flanges 5 fitted to both the top and the bottom of the burner minimize entrainment of surrounding air and keep the gas flow parallel to the burner surfaces. The fuel stream (gaseous fuel diluted with inert gas) is conducted through conduit 6 into the lower tube 1 and flows upward. The oxidizing gas stream ($O_2$ diluted with inert gas) is conducted through conduit 7 into upper tube 2 and flows downward. A flame 8 is generated in the region where the two opposed gas streams impinge. Flame 8 is very flat and uniform in the horizontal plane, i.e., the X-Y plane. The X, Y and Z axes are shown in FIG. 1(a) and FIG. 1(b); all have their zero at the geometric center of the burner.

The basic geometric characteristics of the flow field are illustrated in FIG. 1(a) and FIG. 1(b). The advantage of this geometry is that the gas flow along the stagnation streamline, i.e., Y=0, is essentially one dimensional. The temperature and particle size of the ceramic oxide powders can thus be accurately measured using optical methods. All measurements, e.g., temperature, particle size, and light scattering intensity, are made along this streamline. Precursors of the ceramic oxides, which in the embodiment depicted in FIGS. 1(a) and 1(b) are liquid at room temperature, are added to the flame by bubbling small parts of the fuel stream through one or more gas washing bottles 9 containing the appropriate liquids. Precursor concentrations are calculated using their known vapor pressures and measurements of their flow rates made using gas flowmeter 10. To prevent their premature decomposition, heat sensitive precursors are added to the fuel stream feeding the bottom tube 1 of the furnace which is cooled by an external loop of circulating water, clamped to the burner, rather than to upper tube 2, which is heated by the rising hot exhaust gases.

To reach the fuel, the oxygen needed for the formation of the ceramic oxide particles diffuses down through the stagnation plane, i.e., the horizontal plane in the center of the burner where the two opposed gas streams impinge. Excess oxygen is used, thus minimizing the production of incompletely oxidized particles.

While FIGS. 1(a) and 1(b) show the preferred embodiment where the oxidizing gas stream enters the burner at the top and the fuel gas stream enters at the bottom, it will be understood that the fuel gas stream may enter the burner at the top and the oxidizing gas stream may enter at the bottom. Likewise, the fuel gas steam, the oxidizing gas stream or both streams may contain the ceramic oxide precursors.

For a more detailed description of the counterflow diffusion flame burner, see U.S. Pat. No. 5,268,337 and the publication "Formation of mixed oxide powders in flames: Part I. $TiO_2$—$SiO_2$", by Cheng-Hung Hung and Joseph L. Katz, Journal of Materials Research, Vol. 7, No. 7, pages 1861–1869, (1992), the entire contents of which are hereby incorporated by reference and relied upon.

Powder Collection

A powder collector 12 was constructed that unobtrusively captures and dilutes the hot gas and ceramic oxide particle mixture as it leaves the counterflow diffusion flame burner 11. The powder collector 12 is graphically depicted in FIG. 14 and it use with the burner is shown in FIG. 15. The powder collector 12 is comprised of a front duct 13, a mixing block 15, a rear duct 14, and exit tube 16 and an entrance tube 17. The front duct 13 is inserted into one side of the counterflow diffusion flame burner 11. The gas and ceramic oxide particle mixture exits the counterflow diffusion flame burner 11 and enters the powder collector 12 via the front duct 13. The front duct 13 is connected to a rear duct 14 by means of a mixing block 15. The rear duct 14 is connected to an exit tube 16 which leads to a filter 20. The mixing block 15 is connected to an entrance tube 17 which is connected to a source of dilution gas 22. Two collectors can be used to collect powder from both sides of the burner.

Since the diffusion flame is very sensitive to extraneous air currents, the flow into the particle probe is carefully shaped and controlled to match the outflow of the flame. The powder collector 12 quickly cools and dilutes the gas and ceramic oxide particle mixture with cool nitrogen 22. In this way, the unique particle shapes and crystal phases created in the burner 11 are "frozen" into place and preserved, the collision rate (between particles) is drastically reduced, and further formation of hard agglomerates is prevented. In addition, the diluted gas and ceramic oxide particle mixture can conveniently be sent to gas-borne particle characterization instruments, electron microscope sample probes, light scattering cells, etc.

In the following examples, ceramic oxide particles in the diluted and cooled gas were collected on two 47 mm diameter Nuclepore filters 20 with a 0.2 micron pore size, held in Teflon holders arranged in parallel (FIG. 15). The unnumbered arrows in FIG. 15 indicate the direction of the gases through the powder collection system. Pumping was provided by a dual-chamber GAST diaphragm pump 21 and the flow rate was monitored by a flowmeter 23 connected to the diaphragm pump 21. The pump flowrate fell as powder accumulated on the filters 20. Therefore, the nitrogen dilution flowrate was frequently adjusted to ensure that the powder collector 12 drew the desired amount of effluents from the burner 11. After the collection run, the ceramic oxide powder was gently scraped from the filters 20 using a Teflon scraper, placed in clean glass bottles, and dried overnight at 130° C. in ambient air.

Particle Morphology and Stagnation Plane

In the Counterflow Diffusion Flame Burner, particles exit the flame at locations referred to as particle stagnation planes. Particle stagnation planes are the locations in the flame where the gas velocity is equal and opposite to the thermophoretic velocity applied to the particles because of the very sharp temperature gradients. At such locations, the particles have virtually no mean axial velocity. As a result, the particles are swept out of the burner by the outflowing gases and can be collected. In turn, since the morphology of the particles varies across the flame, one can collect powders with different structures, composition, and morphologies by moving the particle stagnation plane to the appropriate location in the flame. This is accomplished by adjusting the flow rate of argon in the fuel and/or the oxidizer stream. In this way, flames with 1, 2, or 3 stable particle stagnation planes can be generated in the counterflow diffusion flame burner.

Powder Phase and Specific Surface Area Measurements

The powder phase was determined by x-ray powder diffraction, using a Philips PW 1729 x-ray generator, PW 1820 diffractometer, and PW 1710 diffractometer control, and a digital Microvax 3100. Samples were fixed on 1 inch square glass using a 4% solution of Formvar resin in ethylene dichloride. Diffraction patterns were measured from 20 to 80 degrees (2θ). This range was enough to ensure that the major anatase and rutile peaks would be detected.

The specific surface area of powder samples was measured by nitrogen absorption/desorption in a Micromeritics Flowsorb II 2300. Samples were further dried at 120° C. under a flowing mixture of nitrogen and approximately 29% helium for at least 30 minutes. Samples lost negligible mass during drying in the Flowsorb apparatus.

Ceramic Oxide Precursor

By ceramic oxide precursor is meant the source material, e.g., $SiH_4$, $SiCl_4$, $TiCl_4$, $VOCl_3$, $PCl_3$, $VCl_4$, $GeCl_4$, $Al(CH_3)_3$, which after combustion results in the formation of a ceramic oxide powder. By concentration is meant the ratio of moles of precursor to moles of all gases in the stream.

The precursors are usually volatile liquids at room temperature, but it is possible for solid precursors to be used in the practice of this invention. For example, $AlCl_3$ has a sufficiently high vapor pressure that it may be vaporized by heat and the vapors incorporated into the stream.

Flame Temperature

The flame temperature was measured using two different techniques with overlapping ranges. Above 1500 K., the rotational fine structure in the UV absorption spectra of .OH was measured, thus determining the distribution of the ground state population of .OH and, from it, their rotational temperature. Below 2000 K., silica coated Pt-Pt10% Rh thermocouples were used with correction for radiation losses. The flame temperature of the burner is between about 300K. to about 3000K.

Figure 2:
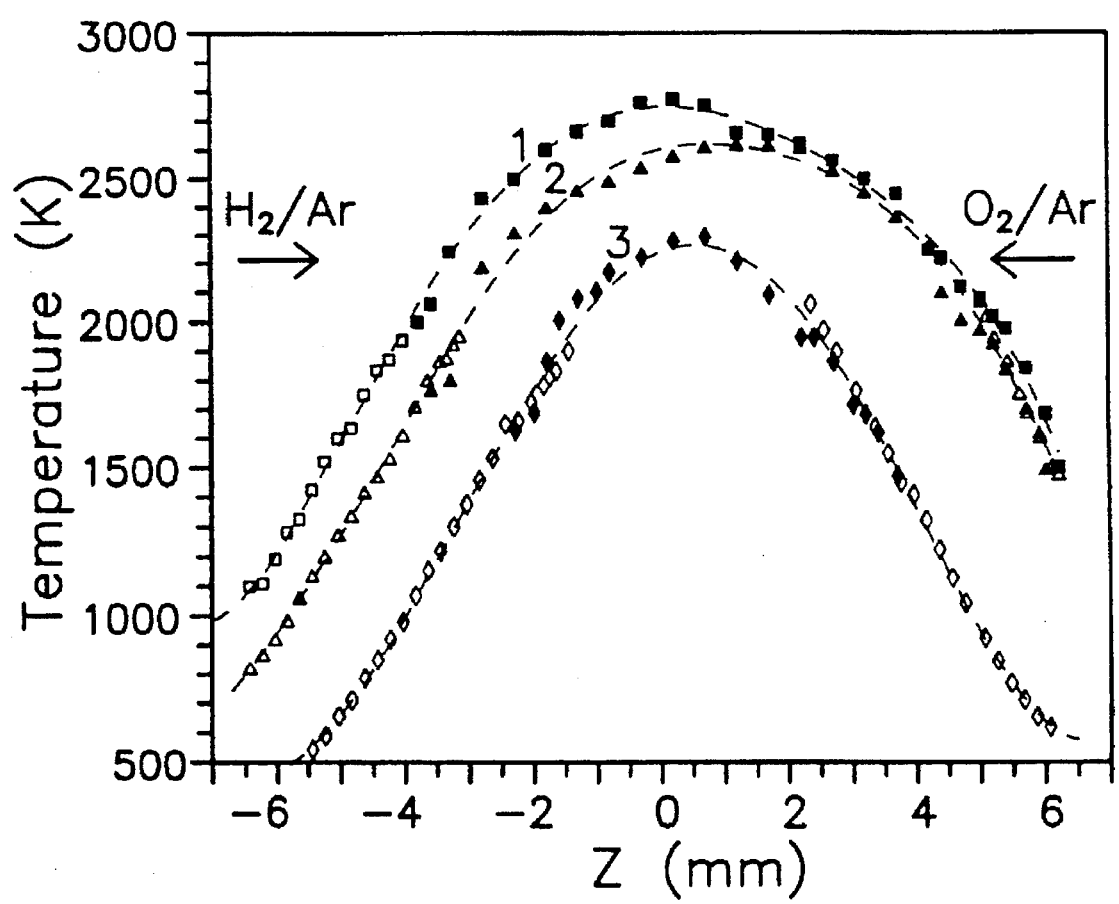
FIG. 2 depicts temperature profiles as a function of height in the diffusion flame burner.

FIG. 2 shows the temperature profiles for three actual flame conditions, measured by both the optical method (solid symbols) and using thermocouples (open symbols). The temperature of the flame is plotted on the vertical axis and the horizontal axis is the Z axis of the burner. The flames are preferably $O_2$ rich, e.g., about 30% excess $O_2$, with momentum ratios of about 0.8. The momentum ratio is the ratio of the momenta of the fuel to the oxidizer streams. This set of conditions places the temperature maximum about 1 mm above the center of the burner on the Z axis while placing the stagnation plane about 2 mm below the center of the burner on the Z axis.

Three different sets of conditions are depicted in FIG. 2. They are shown as flames 1, 2, and 3. These flames exhibit linearly increasing and almost identical temperature gradients in the range along the Z axis of from about −6 mm to about −2 mm, the region where all ceramic oxide particle formation processes occur. Flames 1 and 3 have the same gas velocities and thus the same residence times after correcting the velocity for their temperature differences. Flame 2 has a gas velocity 1.5 times that of flames 1 and 3.

FIG. 2 shows the use of argon as a diluent in both the fuel and oxidizer streams. In the presence of reduced diluent concentrations or in the absence of diluent, flame temperatures exceeding 3000K. have been attained.

Particle Size and Morphology

Particle size and morphology were determined using a high resolution transmission electron microscope providing magnifications as high as 1,200,000 and having a point-to-point resolving power of 3 Å. A thermophoretic sampling method was used to collect particles directly onto carbon coated transmission electron microscopy grids. The sampling probe was designed to minimize disturbance to the flame. The probe was driven in and out of the flame in a total travel time of about 0.1 second by a double acting air cylinder. The transit times were much smaller than the length of time the tip of the probe was stationary at the center of the burner. Accordingly, almost all particles which impinged on the transmission electron microscopy grid did so at the center of the burner.

The thermophoretic probe assembly was adjusted so that the surface of the transmission electron microscopy grid lay exactly in the center of the laser light beam used to measure light scattering, thus ensuring that the in situ particle size measurements made using dynamic light scattering and particle size measurements determined from the transmission electron micrographs were for particles at the same location in the burner.

A photomultiplier at 90° to the argon ion laser beam was used to measure the light scattering intensity. The laser light beam was chopped at 1035 Hz by a mechanical chopper. Cross polarization scattering was eliminated by using a polarizer. Since large particles scatter light much more strongly than small particles, the particles sizes obtained by light scattering measurements were usually larger than those measured by transmission electron microscopy.

Incorporation of Two Precursors a. Scattering Intensities

Scattering intensities were determined in flame 1, the hottest flame depicted in FIG. 2, about 1000K. to 2600K. in the particle formation and growth region, using $TiCl_4$, $SiCl_4$, and their mixtures as precursors. It was found that scattering in the −6.5 to −5 mm region along the Z axis came almost entirely from $TiO_2$ particles. However, in the −5 to −2 mm region along the Z axis, light scattering for the mixture was much stronger than for either pure component.

Figure 3:
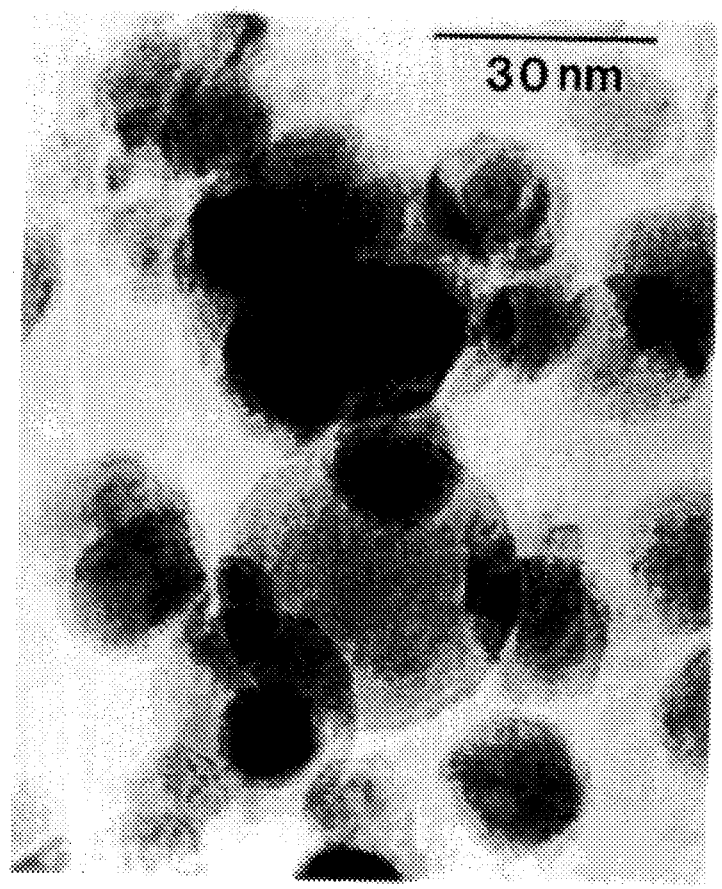
FIG. 3 is a transmission electron micrograph showing smaller $SiO_2$ particles attached to larger particles of $TiO_2$.

A transmission electron micrograph of the mixture sampled at −4.5 mm along the Z axis (about 1800K.) using a $SiCl_4$ to $TiCl_4$ concentration ratio of 1.5:1 is shown in FIG. 3. $SiH_4$ may be substituted for $SiCl_4$. FIG. 3 depicts $TiO_2$ particles with attached $SiO_2$ particles. The presence of additional $SiO_2$ particles, not attached to any $TiO_2$ particles, suggests that the $SiO_2$ particles formed by homogenous nucleation.

The electron diffraction pattern showed that the $SiO_2$ was amorphous and the $TiO_2$ was rutile. In the peak scattering intensity region at −3.3 mm on the Z axis, larger clusters were formed consisting of $TiO_2$ connected and partially covered by $SiO_2$. Above −3.0 mm, where the temperature was higher than the melting temperature of $SiO_2$, $TiO_2$, and their composite (about 2000K., about 2300K., and about 2060K., respectively), the particle size decreased due to sintering and melting. A transmission electron micrograph of a sample taken at these conditions showed smaller $TiO_2$ particles, similar to those shown in FIG. 3 but connected by a matrix of $SiO_2$.

Flame 3, the lowest temperature flame shown in FIG. 2 has a temperature gradient similar to that of flame 1, but its temperatures are about 900K. lower at the same location along the Z axis, and its particle formation and growth region is in the range −6 to −1.5 mm along the Z axis, i.e., at temperatures between 500K. and 2000K. It was found that particles form in the −6 to −5 mm region where the temperature is less than 500K. For some ceramic oxide precursors, particle formation can occur at a temperature as low as 300K.

At higher temperatures, around −3 mm, the formation of $SiO_2$ particles was evidenced by an increase in the scattering intensity. In the peak scattering intensity region (−2.2 mm along with Z axis, about 1600K.), chain-like $SiO_2$ particles were deposited onto the surface of spherical $TiO_2$ particles when the $SiCl_4$ to $TiCl_4$ concentration ratio was 1.5:1.

Figure 4:
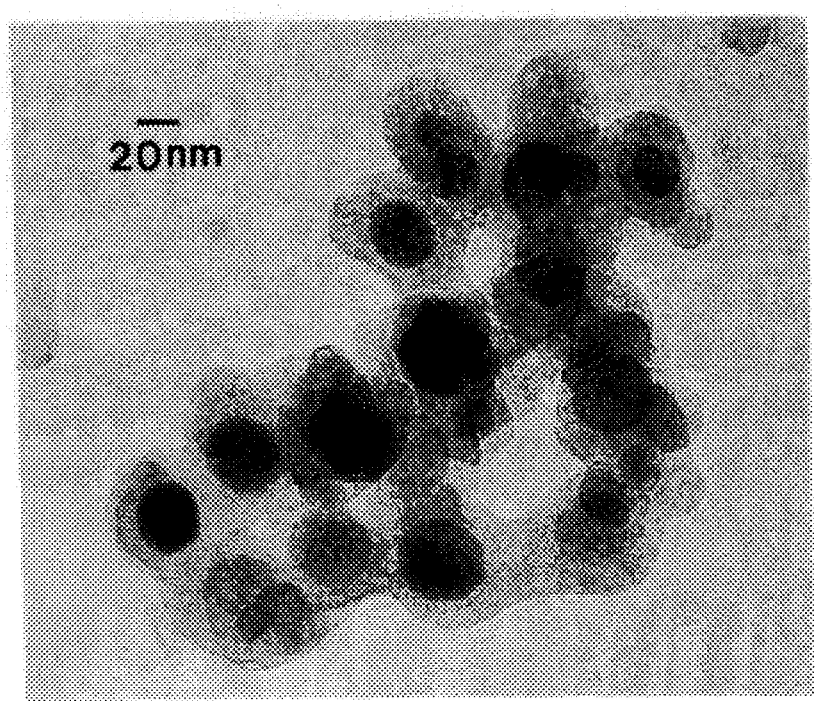
FIG. 4 is a transmission electron micrograph of $TiO_2$ particles coated with $SiO_2$.

A transmission electron micrograph of the material collected in this region is shown in FIG. 4. The black spots are $TiO_2$ particles, 20–38 nm in diameter, and the coating layer is $SiO_2$ 10–30 nm thick. The electron diffraction pattern showed that the $TiO_2$ was rutile and the $SiO_2$ was amorphous. This material is useful as a white pigment and is expected to have utility as a catalyst.

b. Effect of Precursor Concentration Ratios

Figure 5:
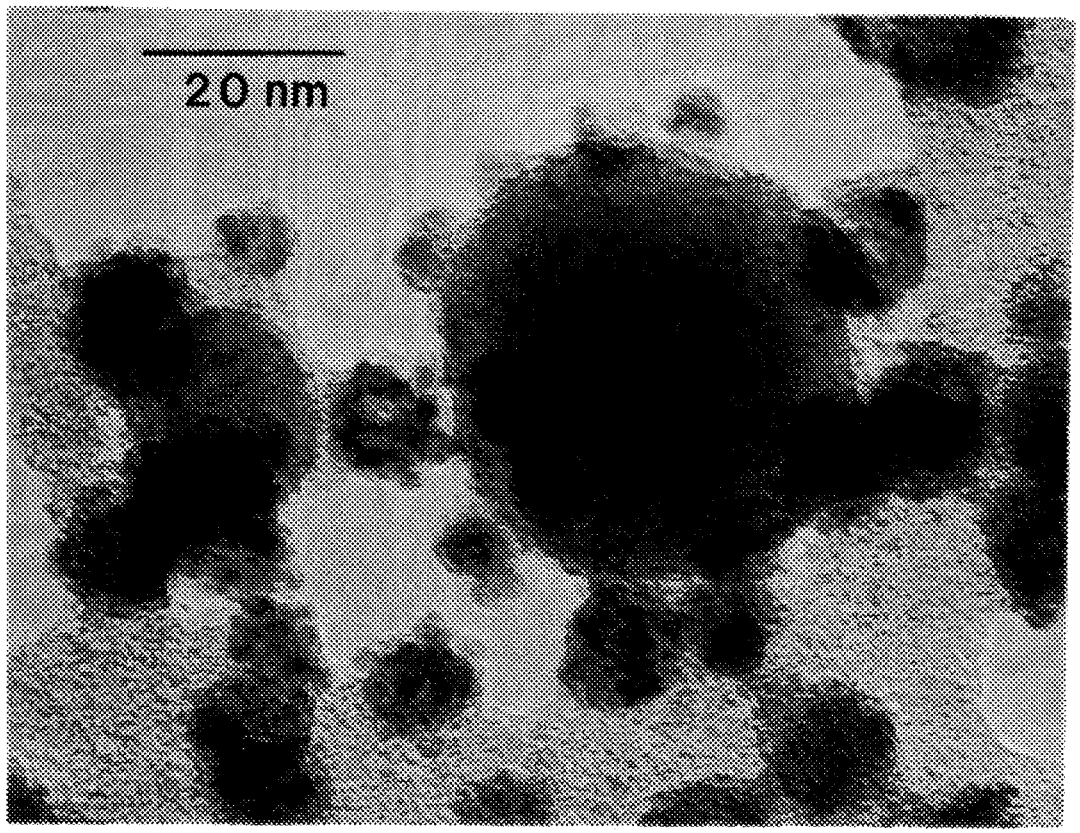
FIG. 5 is a transmission electron micrograph showing $SiO_2$ attached to $TiO_2$.

The effect of precursor concentration ratios was studied using flame 2 depicted in FIG. 2 where the temperature is about 700K. to 2300K. in the particle formation and growth region, and various concentrations of $SiCl_4$ and $TiCl_4$. The $SiCl_4$ concentration may be varied, for example, from 0.001% to 0.06% while the $TiCl_4$ concentration is constant at 0.02%. The $SiCl_4$ to $TiCl_4$ concentration ratio thus may vary from about 0.05:1 to 3.0:1. At a concentration ratio of 0.15:1, the number density of $SiO_2$ particles was too low to cover the $TiO_2$ particles, thus, $TiO_2$ particles covered with discrete $SiO_2$ particles were obtained at 1800K. as shown in FIG. 5. This morphology is similar to that shown in FIG. 3, except that particle sizes were smaller when high gas velocity flame 2 was used. The mixed ceramic oxide powder shown in FIG. 5 is anticipated to be useful as a catalyst.

Figure 6:
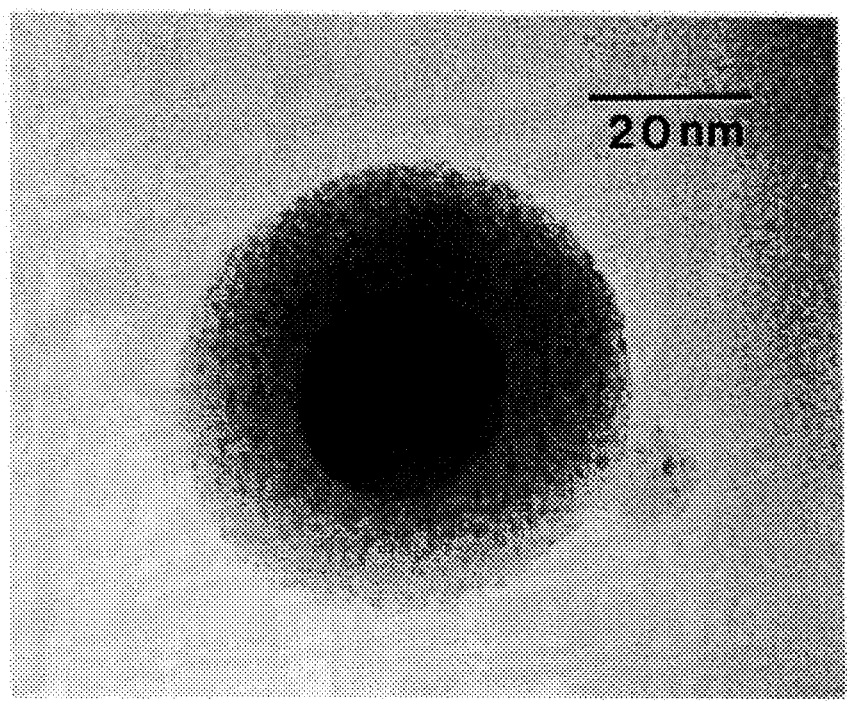
FIG. 6 is a transmission electron micrograph of $TiO_2$ coated with $SiO_2$.

Increasing the $SiCl_4$ to $TiCl_4$ concentration ratio 1.0:1 resulted in a layer of $SiO_2$ covering each $TiO_2$ particle obtained at 1800K. as shown in FIG. 6. The mixed oxide powder of FIG. 6 was compared with that of FIG. 4. It is seen that increasing the gas velocity, the case with the mixed oxide powder of FIG. 6, results in thinner coating layers and smaller diameter central particles. Increasing the $SiCl_4$ to $TiCl_4$ concentration ratio 3.0:1 resulted in a layer of $SiO_2$ 15 to 40 nm thick covering each $TiO_2$ particle. The structure was similar to that shown in FIG. 4, but the thickness of the $SiO_2$ coating was less uniform.

c. Morphology of the Particles

Figure 7:
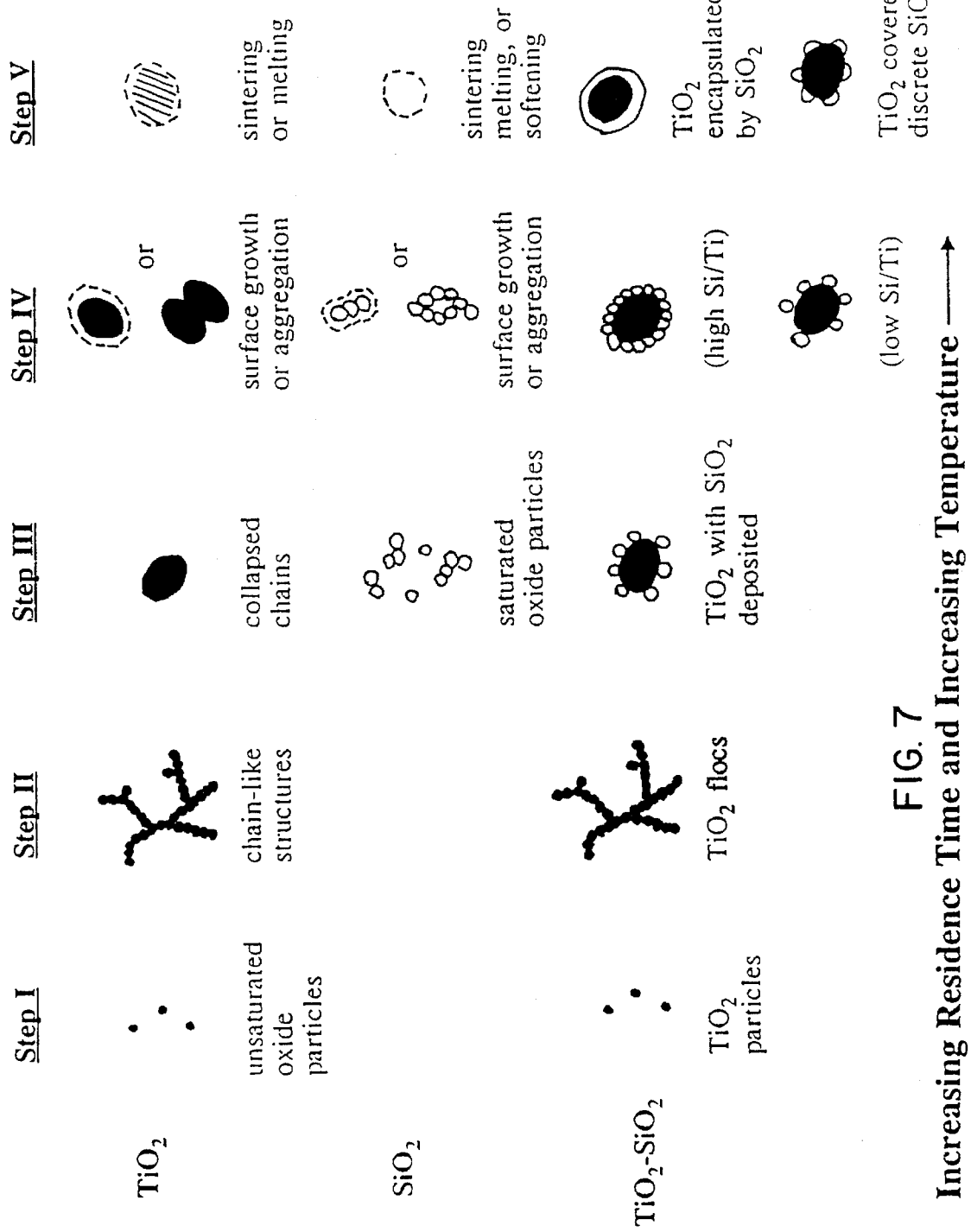
FIG. 7 is a schematic of the particle growth processes for $TiO_2$, $SiO_2$, and $TiO_2$—$SiO_2$.

The morphology of the mixed oxide particles is the result of collision, coagulation, and fusion between two oxides. FIG. 7, a schematic sketch of particle morphology as a function of residence time and temperature, depicts the differences in growth mechanism between $TiO_2$ and $SiO_2$.

$TiO_2$, unlike $SiO_2$, condenses at a location where the temperature is much lower than its melting temperature. It forms as small particles of less fully oxidized oxides and loosely agglomerates into large, open flocs, resulting in the first scattering peak (steps I and II). As these flocs move upward into regions of higher temperature, they compact into much smaller, more nearly spherical particles (step III). This compaction causes a strong drop in light scattering intensity. Surface growth and aggregation cause continued growth of the particles and a resulting increase in the scattering intensity (step IV).

A second drop in intensity occurs when the particles melt (step V). With $SiO_2$, open agglomerates do not appear. Since the particles form around their melting or softening temperature, as they agglomerate they form short chain-like structures (step III). Further surface growth and aggregation lead to a continuing increase in the scattering intensity (step IV), until a strong decrease occurs because the particles melt or soften (step V). These key differences have important implications for the types of mixed oxide particle morphologies that can be produced.

The formation mechanisms for $TiO_2$—$SiO_2$ mixed oxide particles are also shown in FIG. 7. $TiO_2$ forms and condenses into particles at a much lower temperature that $SiO_2$. The $TiO_2$ particles first form flocs. With increasing temperature, the flocs collapse into condensed particles. When $SiO_2$ particles condense, some deposit onto the condensed $TiO_2$ particles (step III). If the number of $SiO_2$ particles is sufficient to cover the $TiO_2$ particles, a coating structure can be obtained. Otherwise, a spotty deposition or a partial coating structure will result.

Three possible mechanisms for the formation of a coating layer are (a) particles of one oxide deposit onto the surface of the other oxide, then melt and flow along the surface to cover the entire particle; (b) one oxide heterogeneously condenses on the surface of the other; (c) particles of one oxide deposit uniformly onto the surface of the other oxide, and then fuse into a smooth coating layer. At low Si to Ti ratios, only $TiO_2$ particles with discrete $SiO_2$ particles attached were observed. At high Si to Ti ratios, $SiO_2$ coating layers were formed whose thicknesses (10 to 25 nm) were about the same as the diameters (10 to 25 nm) of the individual $SiO_2$ particles. Since a coating layer less than 10 nm was never found, it suggested that mechanism (c) is the dominant one, i.e., uniform deposition followed by fusion of the particles.

The differences in the morphologies of mixed oxide particles caused by forming them at different temperature range can be seen by comparing FIGS. 3 and 4. At high temperature ranges (FIG. 3), one sees discrete $SiO_2$ particles attached onto the $TiO_2$ particles while at low temperature ranges (FIG. 4), one sees that the $TiO_2$ particles are encapsulated by $SiO_2$. At high temperature ranges, spherical $SiO_2$ particles and $TiO_2$ agglomerates form.

Since the sizes of the fundamental particles of $TiO_2$ and $SiO_2$ are about the same, the number of $SiO_2$ particles required to cover each $TiO_2$ particle is small. However, at a Si to Ti ratio of 1.5:1, the number of $SiO_2$ particles available is not sufficient to cover the surface of each $TiO_2$ particle, resulting in $TiO_2$ particles with discrete $SiO_2$ particles deposited on them.

In contrast, at low temperature ranges, chain-like $SiO_2$ and nearly spherical $TiO_2$ particles are produced. The size of the $SiO_2$ fundamental particle is much smaller than in the high temperature range flame. Thus, there is enough $SiO_2$ to cover the surface of each $TiO_2$ particle. Because the $SiO_2$ coatings are glassy and easily flow into each other, these particles agglomerate into chains.

The morphology of mixed oxide particles also depends on the Si to Ti concentration ratio. At low Si to Ti ratios, there are insufficient $SiO_2$ particles produced to cover the $TiO_2$ particle surfaces. At high Si to Ti ratios, $SiO_2$-coated $TiO_2$ particles are formed. However, the thickness of the coating layer is not simply proportional to the amount of $SiO_2$ added. Using a medium temperature flame and a Si to Ti ratio of 1:1, a relatively uniform coating about 14 nm thick, as shown in FIG. 6, was obtained. However, at a Si to Ti ratio of 3.0:1, coating layers 15 to 40 nm thick, which were not uniform, were obtained. One possible explanation is that the $SiO_2$ particles deposit onto the surface of $TiO_2$ but do not spread out to become a uniform layer because of their high viscosity.

Thus, the morphology of the mixed oxide particles is controlled by the $SiCl_4$ to $TiCl_4$ concentration ratio, and the temperature range of the flame in the particle formation and growth region. Broadly, when the $SiCl_4$ to $TiCl_4$ concentration ratio is from about 1:1 to about 3:1 and the temperature range of the flame in the particle formation and growth region is from about 500K. to about 2300K., the product is $TiO_2$ particles coated with $SiO_2$. When the $SiCl_4$ to $TiCl_4$ concentration ratio is from about 0.05:1 to about 1.5:1 and the temperature range of the flame in the particle formation and growth region is from about 1000K. to about 2400K., the product is $TiO_2$ particles having discrete $SiO_2$ particles attached hereto.

Thus, by simultaneous combustion of $TiCl_4$ and $SiCl_4$, two useful morphologies were obtained, i.e, $TiO_2$ particles encapsulated by $SiO_2$, and $TiO_2$ particles with discrete $SiO_2$ particles attached. Several million tons of titanium dioxide pigment are produced each year by combustion generation of $TiO_2$ powders which are then coated with a layer of $SiO_2$ using silicate solutions. By use of the one step flame method of this invention, it is possible to produce these $TiO_2$ encapsulated by $SiO_2$ powders more economically and with less environmental difficulties. The powders with discrete particles of $SiO_2$ attached to $TiO_2$ are expected to find utility as catalysts or catalyst supports.

d. Formation of Optical Fibers and Ceramics

In addition to pigments and catalysts, the ceramic oxide powders of this invention may be used to form optical fibers and ceramics. An optical fiber consists of a core of a glass and an optical cladding of lower refractive index. Light propagates along the core by reflecting on the cladding. A mixed ceramic oxide powder of this invention is composed of two glass formers, $SiO_2$ and $GeO_2$, and may be used to prepare optical fibers. $SiO_2$ is the main component of the core and the cladding of the optical fiber. $GeO_2$ is the principal dopant added to the core to increase its refractivity.

$SiO_2$—$GeO_2$ powders are traditionally obtained by the combustion of $SiCl_4$ and $GeCl_4$ in excess $O_2$ using vapor deposition methods, e.g., modified chemical vapor deposition or vapor phase axial deposition. The powders are deposited on a substrate tube or on a spinning rod to obtain a preform. The preform is then heated at about 1800K. to remove .OH and water. Finally, optical fiber is obtained by drawing the preform at high temperature. During this process, the formation of a very uniform mixture of $SiO_2$ and $GeO_2$ is essential to reduce transmission light losses. It should be noted that the modified chemical vapor deposition method is not a flame process and, while the vapor phase axial deposition method employs a diffusion flame burner, it does not employ the counterflow diffusion flame burner of the invention which permits precise control of the morphology, particle size and crystallinity of the ceramic oxide powder produced therein.

Much attention has been devoted to aluminum titanate, i.e., $Al_2O_3.TiO_2$, in the development of ceramic oxides of high strength and low thermal expansion coefficient. $Al_2O_3.TiO_2$ is usually prepared from a mixture of $Al_2O_3$ and $TiO_2$ powders which are ground and mixed in a ball mill or a mechanical mixer and then fired. The formation of defects during firing and sintering, mostly due to nonuniform mixing, is difficult to control by this conventional method. However, by combustion of $TiCl_4$ and $Al(CH_3)_3$ in accordance with the practice of this invention, and by arranging conditions so that the two oxide particles condense at the same time, a homogenous mixture of $TiO_2$ and $Al_2O_3$ of extremely small particle size is obtained. Moreover, since the flame process of this invention provides an environment appropriate for the homogenous mixture to sinter, it is possible to simplify $Al_2O_3.TiO_2$ formation from a multistage process to a single stage process.

The formation of $SiO_2$—$GeO_2$ powders was studied using flame 1 as shown in FIG. 2. The oxides were formed by adding the precursors $SiCl_4$ and $GeCl_4$ at the respective concentrations of 0.6% and 0.1%, a concentration ratio of about 1.7:1, to the fuel stream. However, $SiCl_4$ to $GeCl_4$ concentration ratios as low as about 0.05:1 may be used. The 90° light scattering and the dynamic light scattering were measured for the individual oxides and their mixture along the vertical axis of the burner, i.e., the Z axis. Particle morphology and crystalline form were examined on samples taken at key elevations in the burner and analyzed using a transmission electron microscope and an X-ray diffractometer.

The light scattering intensities as a function of elevation along the Z axis in the burner were determined when $GeCl_4$, $SiCl_4$ and a mixture of the two were added to the fuel stream. The light scattering intensity profile of the mixture was very different from that of $GeCl_4$ or $SiCl_4$ alone. It was much higher for the mixture and showed peaks at two different elevations in the burner. The first peak was observed at −5.4 mm along the Z axis (about 1400K.).

Figure 8:
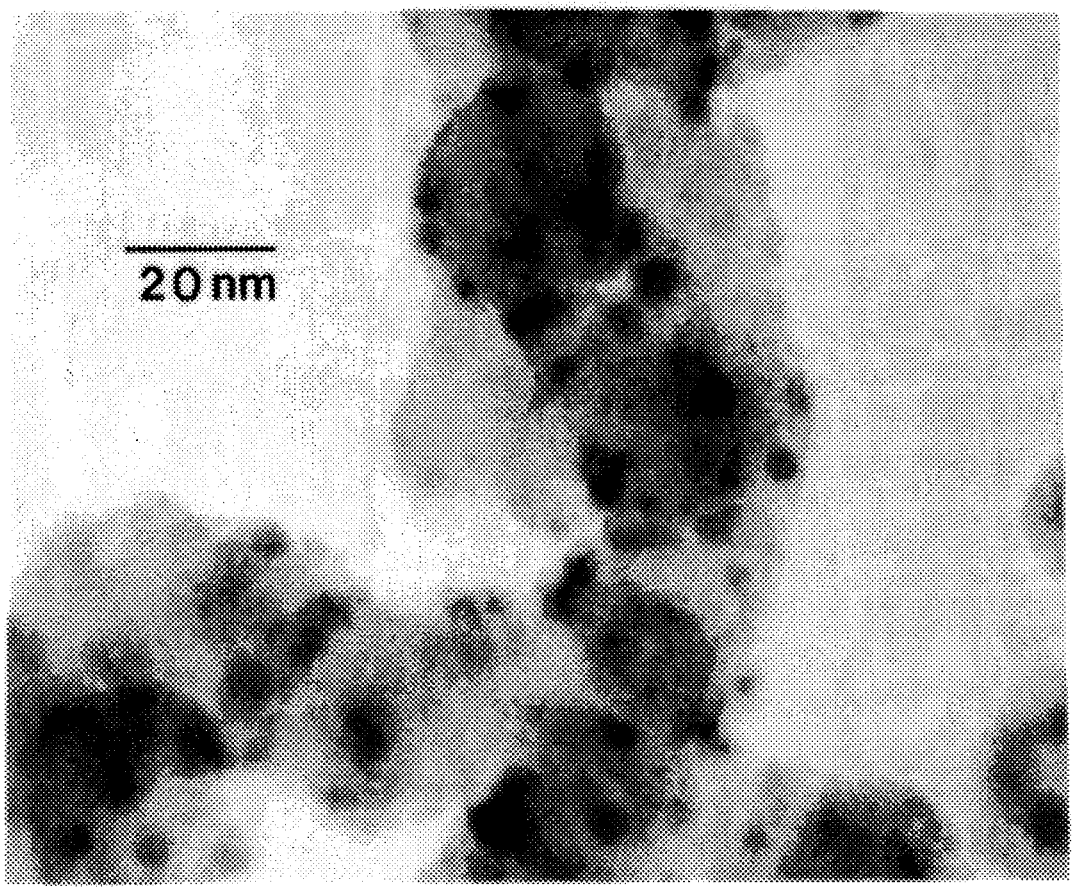
FIG. 8 is a transmission electron micrograph of $GeO_2$ with discrete $SiO_2$ attached.

FIG. 8 is a transmission electron micrograph of a sample taken at this elevation which showed particles of $GeO_2$ covered with approximately 4 nm discrete $SiO_2$ particles. The presence of $SiO_2$ only on the surface of $GeO_2$ suggests that the $SiO_2$ formed by heterogenous nucleation. After a growth stage up to −5.4 mm on the Z axis, the $GeO_2$ particles started to melt as they flowed into regions where the temperature was above their approximately 1350 K. melting temperature. The melting caused coalescence of the particles and was probably the reason the light scattering started to decrease sharply at −5.4 mm on the Z axis. The further deposition of $SiO_2$ increased the diameter of the particles, causing an increase of the scattering intensity which began at −5.2 mm on the Z axis. At about −2.7 mm on the Z axis (about 2400K.), a second peak was encountered. The scattering intensity at this peak was too high to be due only to $SiO_2$.

Figure 9:
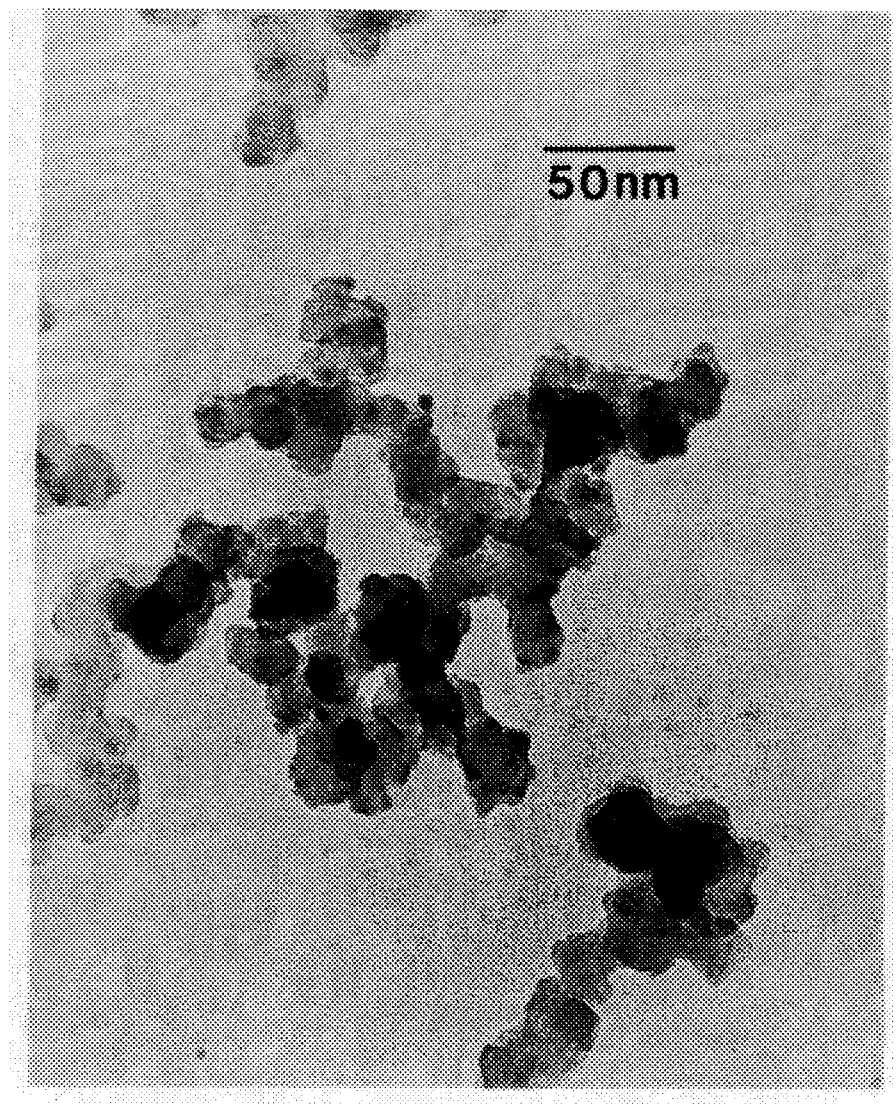
FIG. 9 is a transmission electron micrograph of a 1:1.6 mixture of $SiO_2$ and $GeO_2$.

FIG. 9 is a transmission electron micrograph of particles collected at this elevation, a very uniform mixture of $GeO_2$ and $SiO_2$. The Ge to Si molar ratio, measured by analytic electron microscopy, was about the same as that in the feed, i.e., about 1.6:1. The electron diffraction pattern showed the mixture to be amorphous.

It should be noted that, −2.7 mm along the Z axis, the temperature is well above the melting temperatures of $GeO_2$ and $Si_2$, approximately 1350K. and 2000K., respectively. Thus, the sharp decrease in light scattering intensity observed after the second peak was probably due to the melting of the particles.

Particle size as a function of height in the burner was measured by dynamic light scattering when the mixture of $SiCl_4$ and $GeCl_4$ was added to the fuel stream. The diameter of the particles increased between −6.1 mm and −3.9 mm on the Z axis due primarily to surface condensation of $SiO_2$ onto $GeO_2$. The diameter of the particles remained almost constant from −3.9 mm to −2.8 mm on the Z axis. A sharp decrease in particle diameter above −2.8 mm on the Z axis was mainly due to coalescence and melting of the particles.

Figure 10:
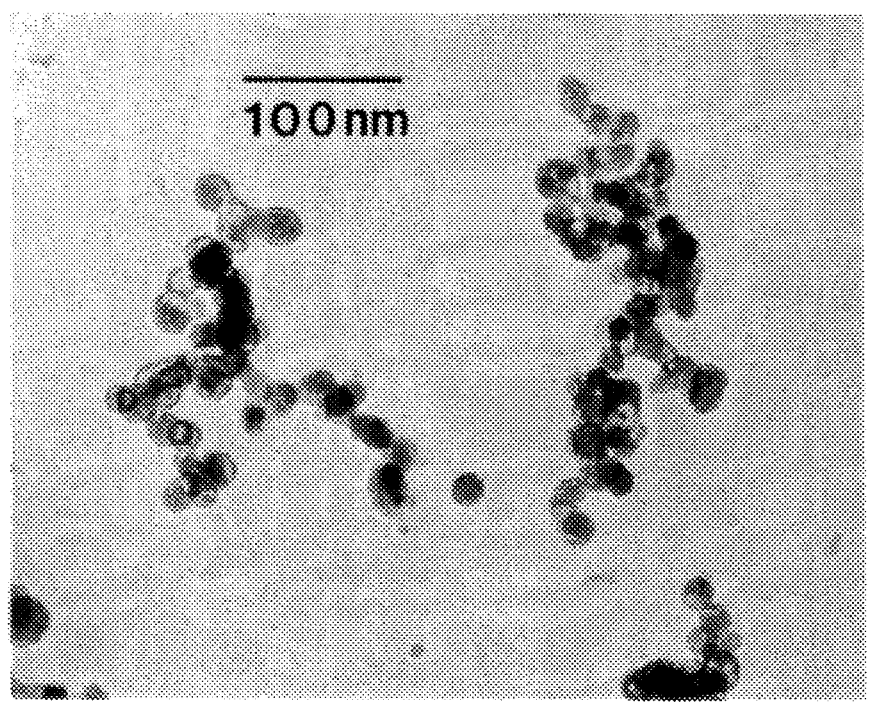
FIG. 10 is a transmission electron micrograph of a 1:1 mixture of $Al_2O_3$ and $TiO_2$.

Light scattering intensity as a function of elevation along the Z axis in the burner using flame 1 as shown in FIG. 2 was determined for a 1:1 mixture of $Al(CH_3)_3$ and $TiCl_4$. FIG. 10 is a transmission electron micrograph of a sample collected at −5.7 mm on the Z axis (about 1350K.), the first scattering maximum. The sample had a chain-like structure consisting of approximately 10 nm particles. Analytic electron microscopy analysis showed that the particles had an Al to Ti mole ratio of 1:1, i.e., the same mole ratio as the feed. As they flowed upward in the burner, the chain-like structures compacted to form nearly spherical particles, causing a sharp decrease in scattering intensity.

Figure 11:
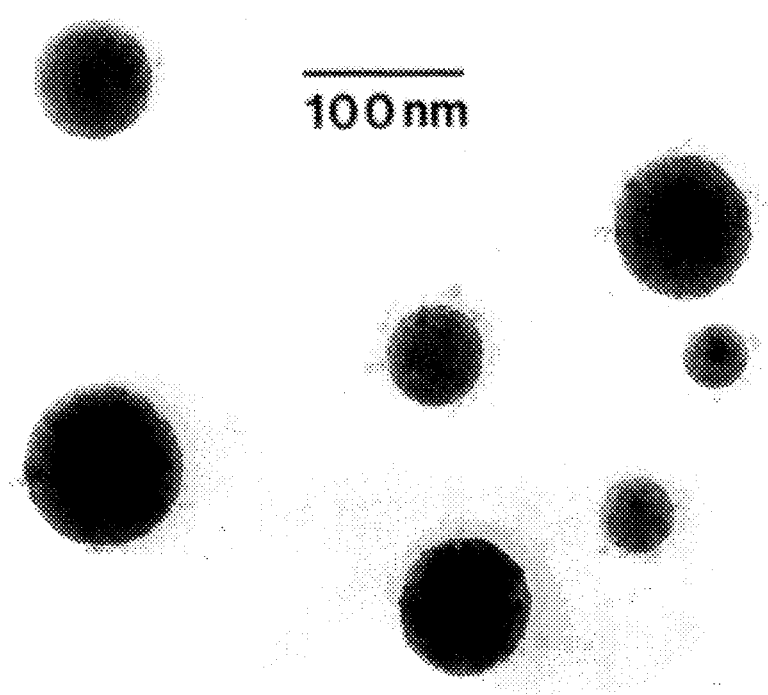
FIG. 11 is a transmission electron micrograph of a uniform mixture of $Al_2O_3$ and $TiO_2$.

FIG. 11 is a transmission electron micrograph of a sample collected in this region, −4 mm on the Z axis (about 2000K.). These particles were spherical and approximately 65 nm in diameter. Analytic electron microscopy on individual particles again showed an Al to Ti mole ratio of 1:1. Between −4.5 mm and −2.8 mm on the Z axis, the diameters of these spherical particles increased through surface growth and aggregation, causing a second increase in scattering intensity. A second peak occurred at −2.8 mm on the Z axis (about 2300K.).

Figure 12:
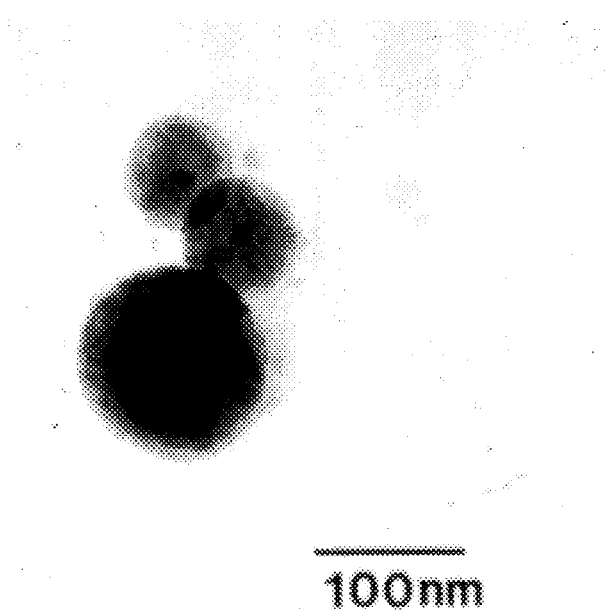
FIG. 12 is a transmission electron micrograph of a uniform mixture of $Al_2O_3$ and $TiO_2$.

FIG. 12 is a transmission electron micrograph of a sample taken at about the location of this second peak and shows particles which are larger, i.e., about 80 nm in diameter, than those shown in FIG. 11. The X-ray diffraction patterns on the sample of FIG. 12 showed three different crystalline phases: aluminum titanate, rutile, and $Al_2O_3$. As these particles flowed upward in the burner, they encountered temperatures which were higher than the melting temperatures of $Al_2O_3$, $TiO_2$, or their composite (2300K., 2100K., and approximately 2100K., respectively). They then coalesced and melted, causing a sharp decrease in light scattering intensity.

The foregoing would apply for $Al(CH_3)_3$ to $TiCl_4$ mole ratios within the range of from about 1:1 to about 3:1. However, a mole ratio of about 1:1 is preferred.

FIG. 13 is a schematic sketch of the mechanism for the formation of $SiO_2$—$GeO_2$ and $Al_2O_3$—$TiO_2$. In the $SiO_2$—$GeO_2$ mixture, the first particles which form are pure $GeO_2$ (step I). As they nucleate, these $GeO_2$ particles agglomerate and form larger particles (step II). As they flow upward, the temperature increases and some $SiO_2$ nucleates heterogeneously on the surface of $GeO_2$ (step III), as can be seen in FIG. 8. It is likely that further deposition of $SiO_2$ gives rise to a coating of $SiO_2$ enclosing the $GeO_2$ particles (step IV). As the particles continue to flow upward and encounter temperatures higher than the melting temperature of the two oxides, their Si—Ge composition becomes very uniform (see FIG. 9 and step V in FIG. 13).

With $Al_2O_3$—$TiO_2$, both oxides form at the same elevation in the burner (step I). As they nucleate, they aggregate to form the chain-like structures (step II) shown in FIG. 10. As the chain-like particles flow upward into higher temperatures, they compact into nearly spherical particles of very uniform composition (step III). By surface growth and aggregation, the particle size increases (step IV). Aluminum titanate ($Al_2O_3.TiO_2$) forms at temperatures higher than about 1550K. (step V). The diameters of aluminum titanate particles are very small, approximately 80 nm, compared to the diameters of aluminum titanate particles produced by traditional methods.

e. The Vanadyl Pyrophosphate Catalyst

Vanadium-phosphorus oxides are the most widely used catalysts for the selective oxidation of n-butane to maleic anhydride. In the extensive literature regarding this very complex mixed oxide system, there is general agreement that the most active catalytic phase is mainly composed of the vanadyl pyrophosphate, $(VO)_2P_2O_7$.

$(VO)_2P_2O_7$ is obtained by dehydration of vanadium hydrogen phosphate hydrate, $VOH_xPO_4.yH_2O$, phases in nitrogen atmospheres, at temperatures ranging from 500° C. to 750° C. There are 7 such phases known in the literature: 6 $VOHPO_4.yH_2O$ phases (with y=0.5, 1, 2(2), 3, 4) and $VOH_{0.18}PO_4.1.9H_2O$.

Using the burner we have synthesized the following new vanadium hydrogen phosphate hydrate, $VOH_xPO_4.yH_2O$, powders:

$(VOPO_4)_{1-x}(VOHPO_4)_x.2.6H_2O$ was obtained by adding a 1:1 mixture of a vanadium precursor ($VOCl_3$ or $VCl_4$) and a phosphorus precursor ($PCl_3$) to the fuel stream of Flame 1. This new vanadium hydrogen phosphate hydrate has the X-ray diffraction shown in FIG. 18.

$(VOPO_4)_{1-x}(VOHPO_4)_x.2.9H_2O$ was obtained by adding a 1:1 mixture of a vanadium precursor ($VOCl_3$ or $VCl_4$) and a phosphorus precursor ($PCl_3$) to the fuel stream of Flame 3.

Figure 19:
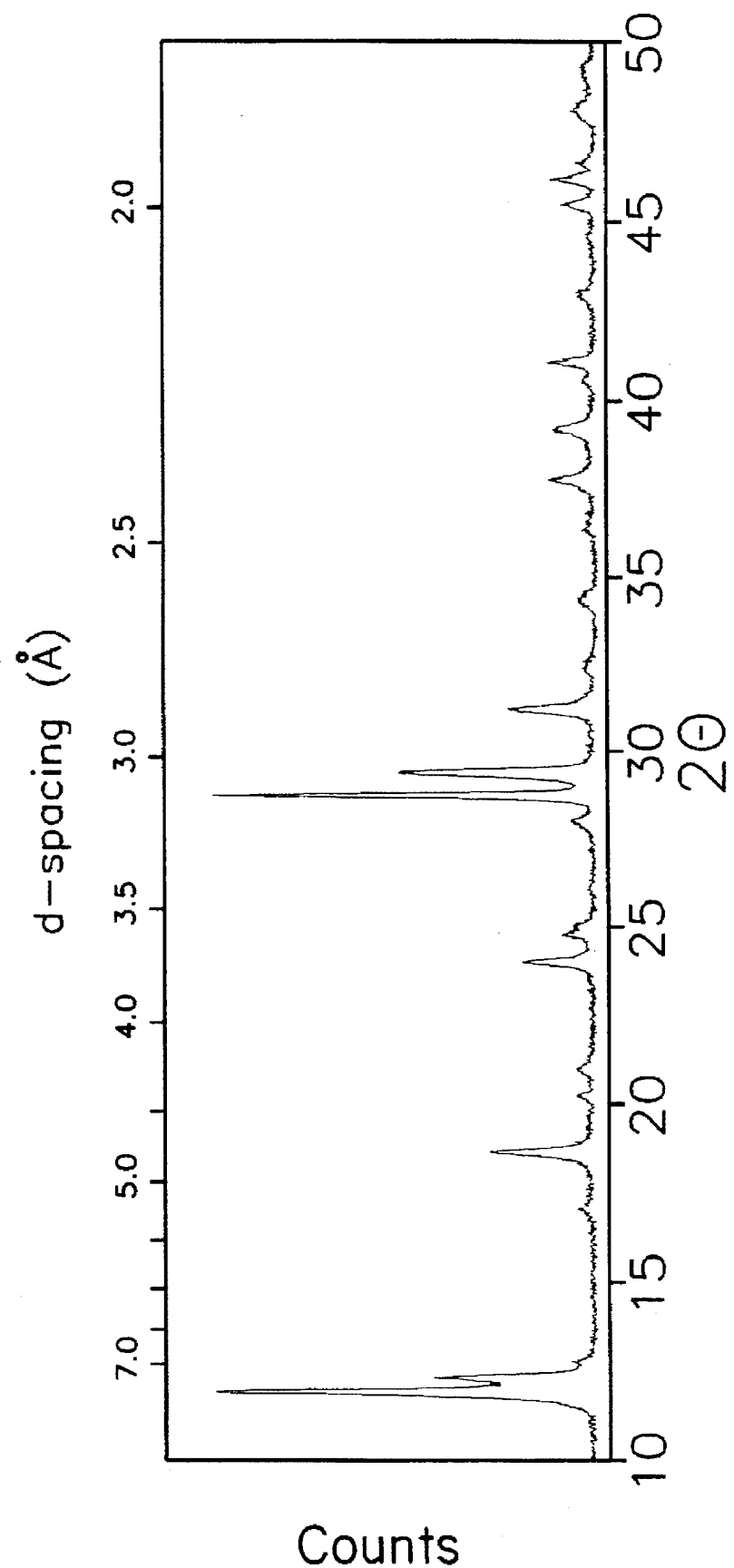
FIG. 19 shows the X-ray diffraction pattern of the other new vanadium hydrogen phosphate hydrate disclosed as part of the present invention.

This other new vanadium hydrogen phosphate hydrate has the X-ray diffraction shown in FIG. 19.

These two powders are very valuable because they transform into two polytypes of $(VO)_2P_2O_7$ upon dehydration in an oxygen free atmosphere at about 750° C. $(VO)_2P_2O_7$ was postulated by others (M. R. Thompson, A. C. Hess, J. B. Nicholas, J. C. White, J. Anchell, and J. R. Ebner, *A Concise Description of the Bulk Structure of Vanadyl Pyrophosphate and Implications for the n-Butane Oxidation*, in "New Developments in Selective Oxidation II, V. Cortes Corberan and S. Vic Bellon, Eds., p. 176, 1994) to be able to accommodate various polytypes (polytype=same crystalline phase but different degree of disorder in the structure). There are two known polytypes of $(VO)_2P_2O_7$: the platelet structure (also referred to as $\gamma$-$(VO)_2P_2O_7$ and $\beta$-$(VO)_2P_2O_7$). Upon dehydration of the new $VOH_xPO_4 \cdot yH_2O$ powders obtained in the burner, two new polytypes of $(VO)_2P_2O_7$ were obtained.

Figure 18:
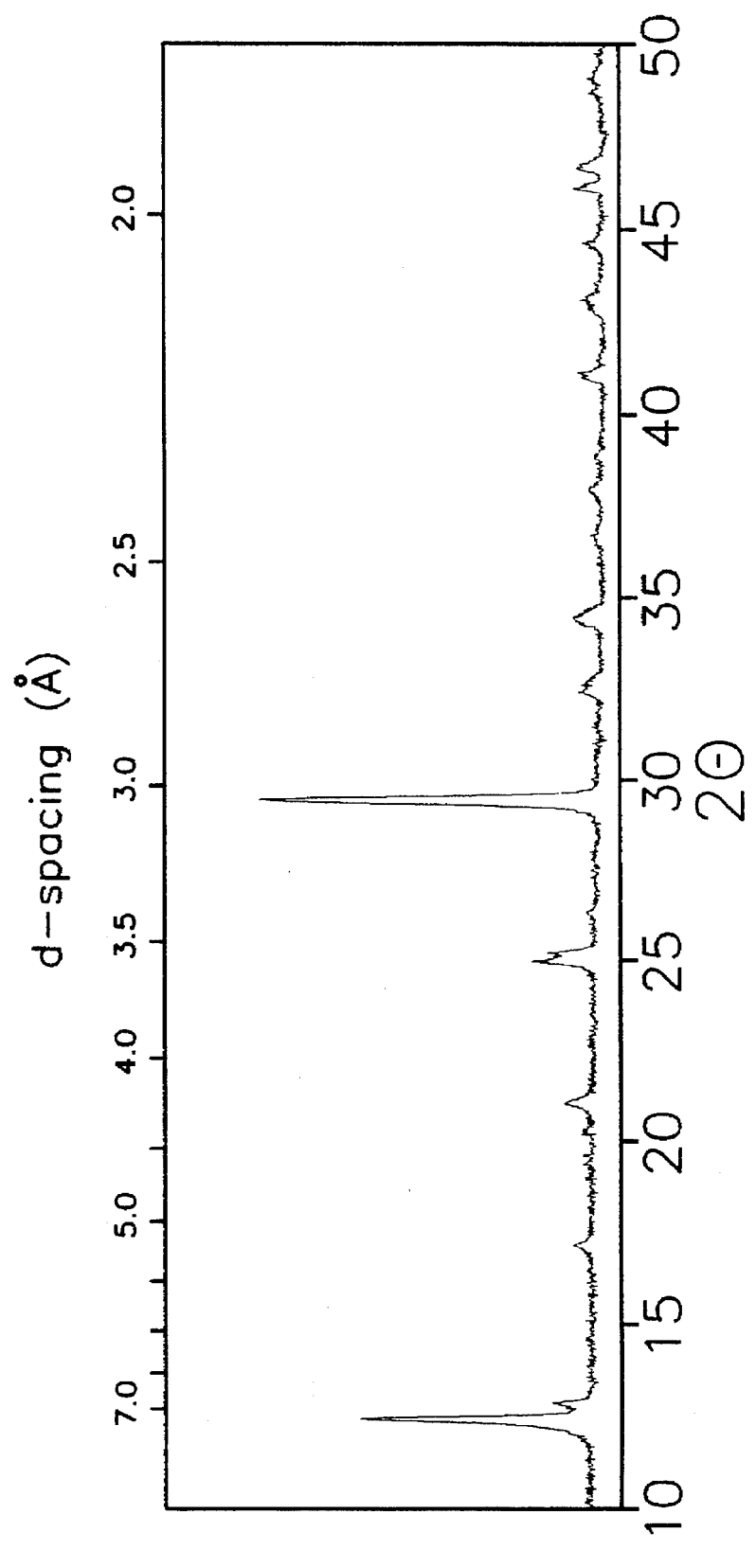
FIG. 18 shows the X-ray diffraction pattern of one of two new vanadium hydrogen phosphate hydrates disclosed as part of the present invention.
Figure 20:
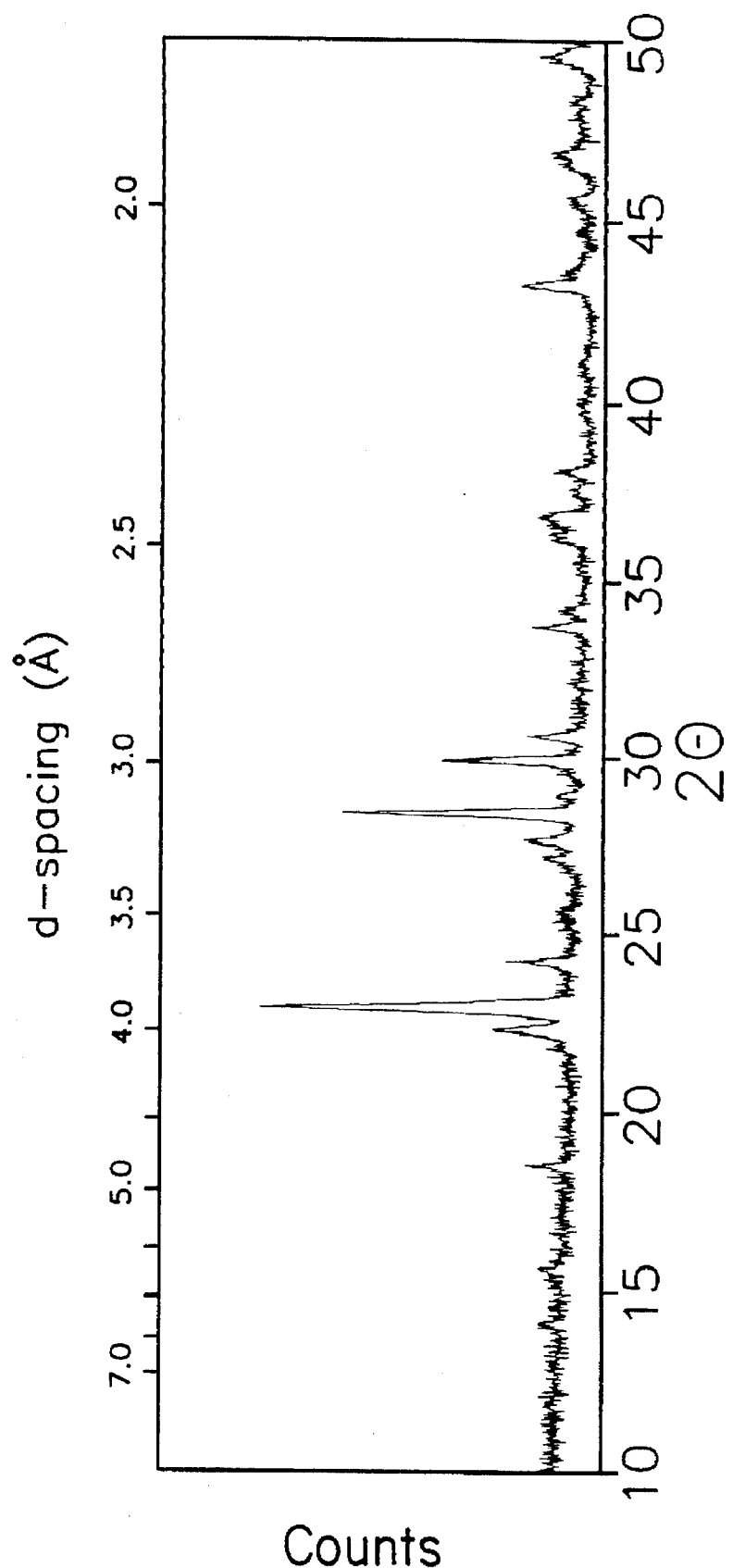
FIG. 20 shows the X-ray diffraction pattern of one of two new vanadium pyrophosphate polytypes disclosed as part of the present invention.
Figure 21:
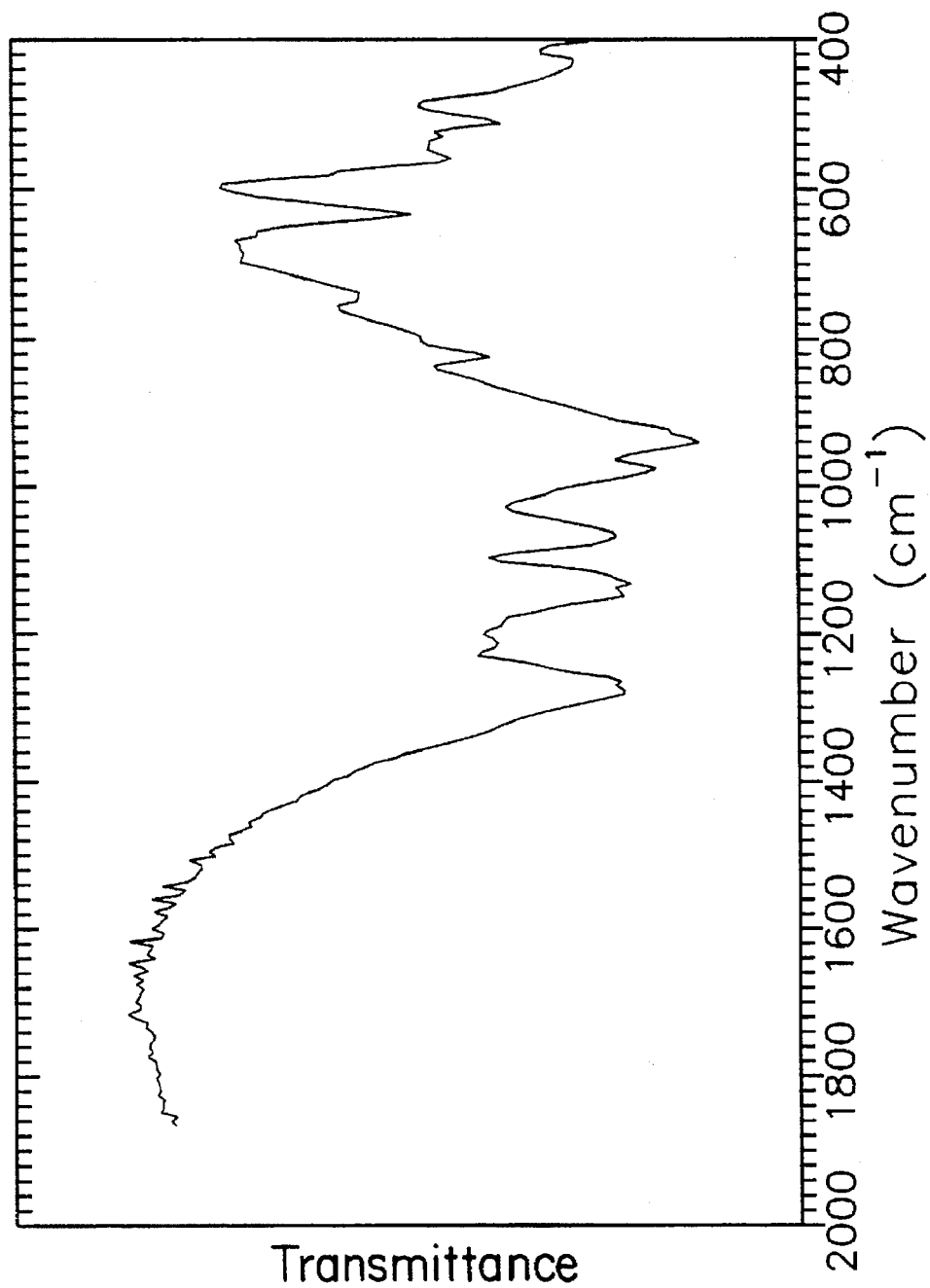
FIG. 21 shows the Fourier Transform-InfraRed (FT-IR) spectrum of the vanadium pyrophosphate polytype disclosed in FIG. 20.

FIG. 20 shows the X-ray diffraction pattern of one of the two new vanadium pyrophosphate polytypes, which was produced by dehydration of the new vanadium hydrogen phosphate disclosed in FIG. 18. FIG. 21 shows the FT-IR spectrum of the vanadium pyrophosphate polytype disclosed in FIG. 20.

Figure 22:
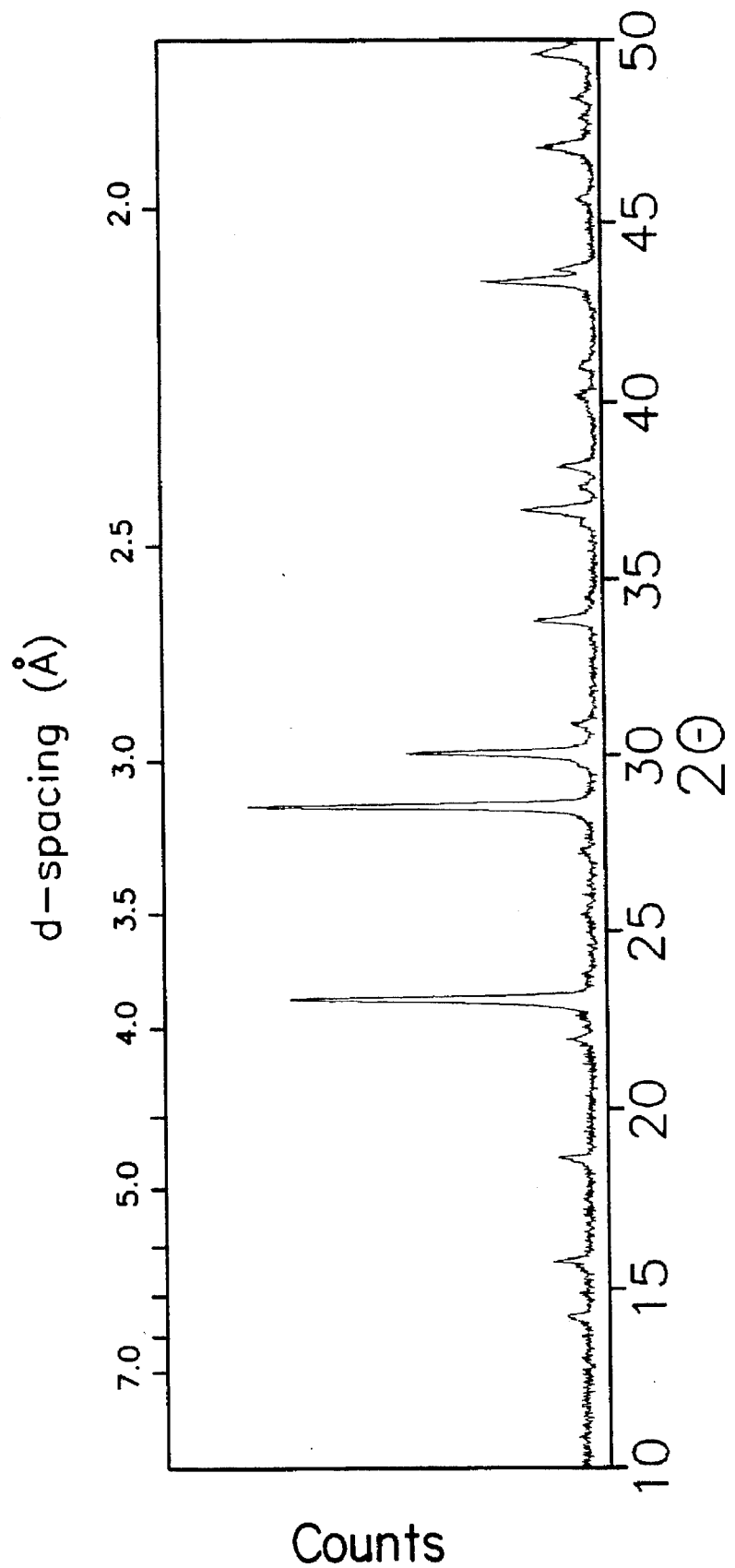
FIG. 22 shows the X-ray diffraction pattern of the other new vanadium pyrophosphate polytype disclosed as part of the present invention.
Figure 23:
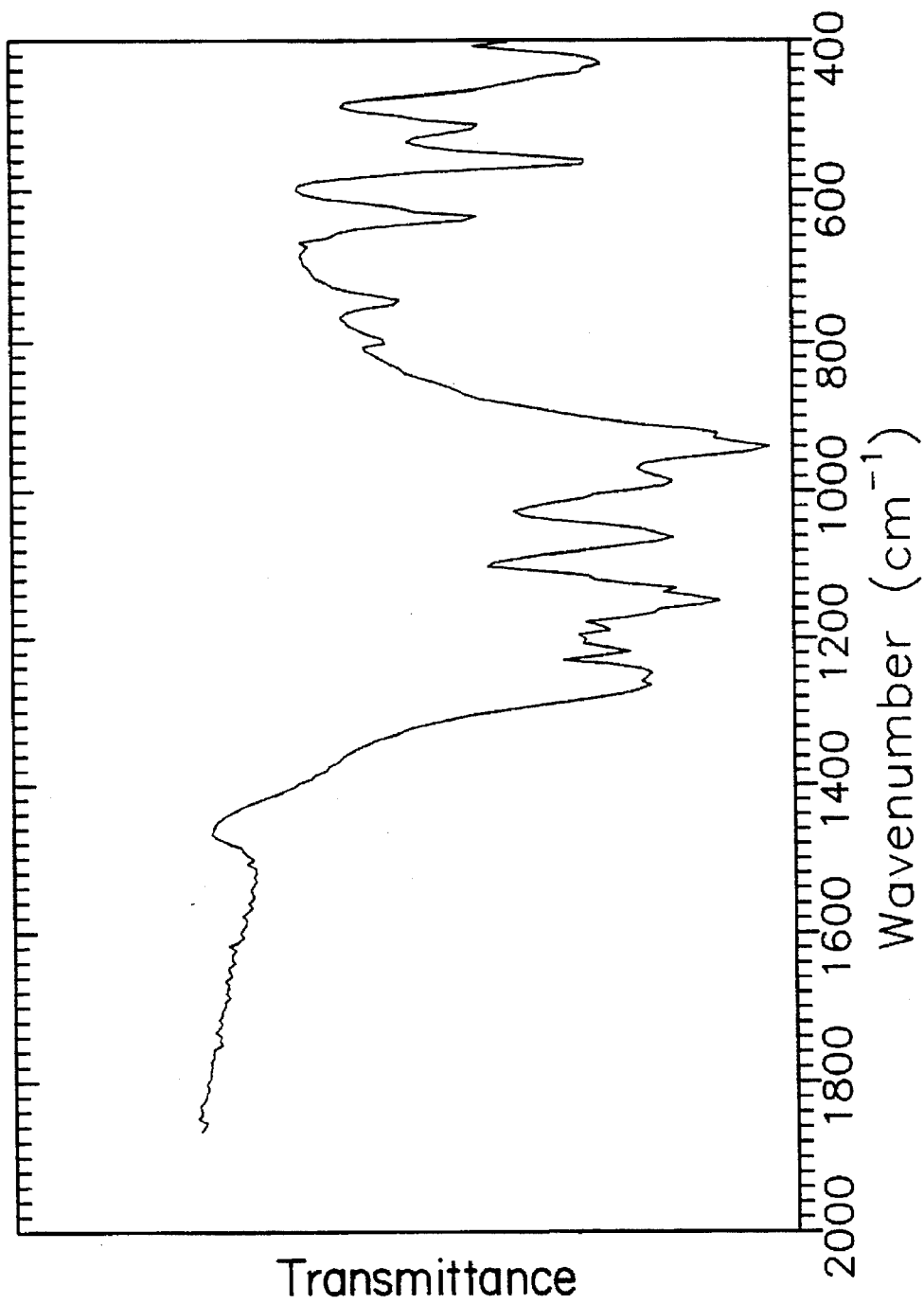
FIG. 23 shows the Fourier Transform-InfraRed (FT-IR) spectrum of the vanadium pyrophosphate polytype disclosed in FIG. 22.

FIG. 22 shows the X-ray diffraction pattern of the other new vanadium pyrophosphate polytype, which was produced by dehydration of the new vanadium hydrogen phosphate disclosed in FIG. 19. FIG. 23 shows the FT-IR spectrum of the vanadium pyrophosphate polytype disclosed in FIG. 22.

Incorporation of One Precursor

The following examples describe measurements of the phase and specific surface area of powders synthesized under various conditions in the counterflow diffusion flame. It was found that, by feeding $TiCl_4$ to the oxidizer stream only, at a concentration of 0.05% (by volume), one obtains anatase $TiO_2$ powders, while feeding $TiCl_4$ to the fuel stream only, at the same concentration, resulted in rutile $TiO_2$ powders. The same effect occurs at a concentration of 0.09% (by volume).

Feeding $TiCl_4$ to the oxidizer stream only, at a concentration of 0.05% (by volume), resulted in $TiO_2$ powders with a specific surface area of 70 m$^2$/g, while feeding $TiCl_4$ to the fuel stream only, at the same concentration, resulted in $TiO_2$ powders with a specific area of 48 m$^2$/g. The same trend occurs at a concentration of 0.09% (by volume), where the specific surface areas are 54 m$^2$/g and 40 m$^2$/g for the oxidizer and fuel streams, respectively.

These results demonstrate that the counterflow diffusion flame process can be manipulated to produce either of the major commercial titania phases with a wide range of specific surface areas. They also demonstrate that placing the precursor in the oxygen stream instead of the fuel stream can lead to new and valuable results. When using more than one precursor, they can be placed in either stream on in both, again with differing results Flames 2 and 3 (FIG. 2) were used in these examples. Four configurations in flame 3 are presented: $TiCl_4$ mixed with the fuel stream, $TiCl_4$ mixed with the oxidizer stream, $SiCl_4$ mixed with the fuel stream, and $SiCl_4$ mixed with the oxidizer stream. In addition, two configuration in flame 2 are presented: $TiCl_4$ mixed with the fuel stream, and $SiCl_4$ mixed with the fuel stream. In each configuration, several precursor concentrations were tested.

a. Results with $TiCl_4$

Figure 16:
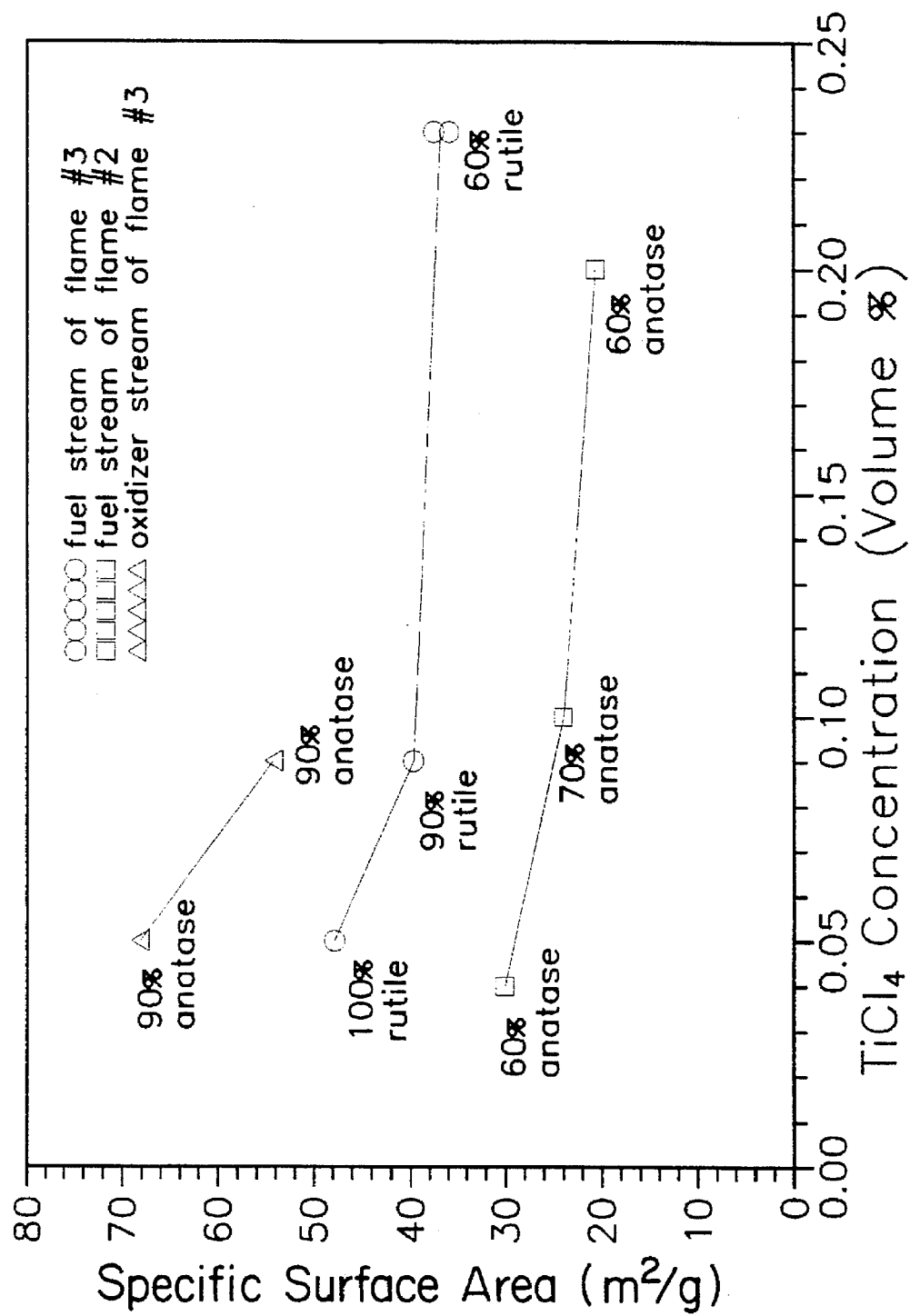
FIG. 16 is a graphic representation of the specific surface area of the $TiO_2$ produced by incorporation of $TiCl_4$ into either the fuel stream or the oxidizer stream of the counterflow diffusion flame burner as a function of the concentration of $TiCl_4$ in the stream.

FIG. 16 shows the results for $TiCl_4$. When feeding through the fuel side in flame 3, the powder was 100% (±5% by X-ray) rutile for 0.05% precursor concentration. The powder was 90% rutile and 10% anatase for 0.09% precursor concentration and was 60% rutile and 40% anatase for a precursor concentration of 0.23%. The specific surface area decreased with increasing precursor concentration, ranging from 48 m$^2$/g at 0.05%, to 40 m$^2$/g at 0.09%, to 36 m$^2$/g at 0.23%.

When $TiCl_4$ was fed to the fuel side of flame 2, the powder was 60% anatase for 0.04% precursor concentration, 70% anatase for 0.10% precursor concentration and 60% anatase for 0.20% precursor concentration. The specific surface area decreased with increasing precursor concentration, ranging from 30 m$^2$/g at 0.04%, to 24 m$^2$/g at 0.10%, to 21 m$^2$/g at 0.20%.

When $TiCl_4$ was fed to the oxygen size of flame 3, the powder was 90% for precursor concentrations of 0.05% and 0.09%. The specific surface area decreased with increasing precursor concentration, ranging from 68 m$^2$/g at 0.05% to 54 m$^2$/g at 0.09%.

b. Results with $SiCl_4$

Figure 17:
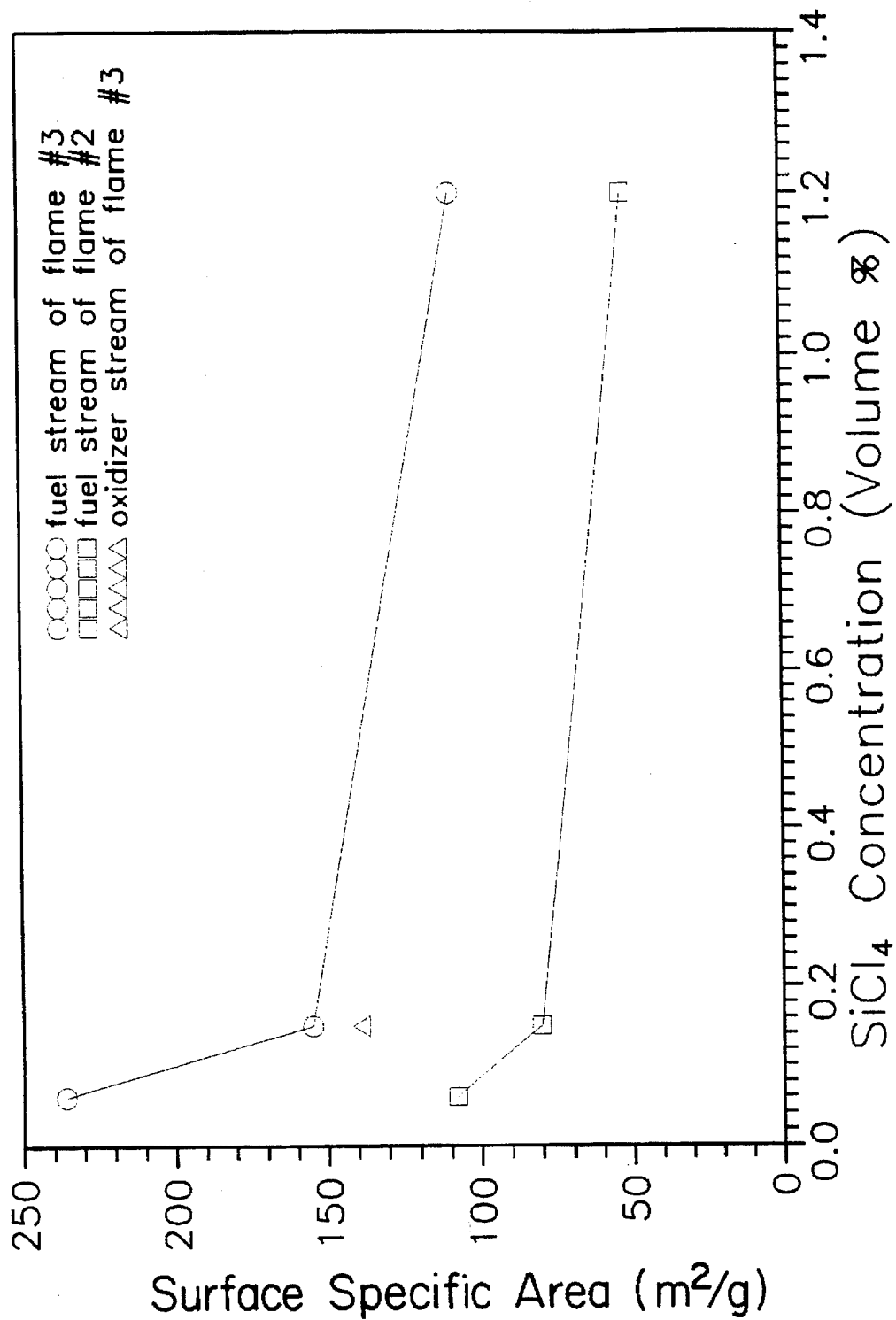
FIG. 17 is a graphic representation of the specific surface area of the $SiO_2$ produced by incorporation of $SiCl_4$ into either the fuel stream or the oxidizer stream of the counterflow diffusion flame burner as a function of the concentration of $SiCl_4$ in the stream.

FIG. 17 shows the results for $SiCl_4$. We assume the powder produced in the flames from $SiCl_4$ was amorphous. When $SiCl_4$ was fed to the fuel side of flame 3, the specific surface area decreased with increasing precursor concentration, ranging from 236 m$^2$/g for 0.06%, to 155 m$^2$/g at 0.15%, to 109 m$^2$/g at 1.2%.

When $SiCl_4$ was fed to the fuel side of flame 2, the specific surface area decreased with increasing precursor concentration, ranging from 108 m$^2$/g at 0.06%, to 80 m$^2$/g at 0.15%, to 53 m$^2$/g at 1.2%. When $SiCl_4$ was fed to the oxygen side of flame 3, the specific surface area was 139 m$^2$/g at 0.15%.

These results show that both of the major commercial phases of titania (rutile and anatase) can be synthesized in the counterflow diffusion flame burner. Mixtures of the two (in various proportions) can also be synthesized. The present results show how the burner parameters can be controlled to arrive at the desired phase. Feeding $TiCl_4$ in the fuel stream of flame 3 leads to rutile powder (except at the highest precursor concentration), while feeding $TiCl_4$ in the oxidizer stream leads to anatase powder. Feeding $TiCl_4$ to the fuel stream of flame 2 leads to a mixture of anatase and rutile.

The results also show that the specific surface area of the powder can be controlled through the precursor concentration and/or the flame temperature. Higher precursor concentrations and higher flame temperatures lead to lower specific surface areas.

The counterflow diffusion flames process allows one to produce powders of controllable phase and specific surface area. This makes it an ideal technology for producing the ceramic powders needed to manufacture paint opacifiers, catalysts, catalyst supports, ceramic membranes, fiber optics, liquid thickeners, varistors, capacitors, and other products yet to be developed.

In its broadest sense, the instant invention provides ceramic oxide powders and processes for their preparation. The invention is particularly concerned with ceramic oxide powders formed from precursors in a counterflow diffusion flame burner. By varying process conditions, ceramic oxide powders having the desired particle size, morphology, and degree of crystallinity can be obtained. The nature of the ceramic oxide powder produced may be varied by the temperature of the flame, the precursor concentration ratio, the gas stream used and the gas velocity. The nature of the product is very temperature dependent.

While the disclosure contained herein illustrates the different products obtained at different levels in the flame of the diffusion counterflow flame burner, and hence at different temperature, it will be understood by those skilled in the art that by controlling flame temperature range in the particle formation and growth region, gas steam, gas velocity, and precursor concentration ratio, a uniform ceramic oxide powder having the desired properties may be produced using the diffusion counterflow flame burner. Thus, by controlling the reaction conditions, the product may be a ceramic oxide powder useful as a pigment, as a catalyst, as a catalyst support, as a ceramic, as a superconductor, or as an optical fiber. In addition, the ceramic oxide powder produced by the practice of the invention may be a compound formed from one or two different ceramic oxides.

While the present invention has been described in connection with what is presently considered to be the most practical and preferred embodiments, it is to be understood that the invention is not to be limited to the disclosed embodiments, but on the contrary is intended to cover various modifications and equivalent arrangements included within the spirit and scope of the appended claims. Thus, it is to be understood that variations in the processes for the formation of a ceramic oxide powder can be made without departing from the novel aspects of this invention as defined in the claims.

What is claimed is:

1. A process for the formation of a ceramic oxide powder, comprising the steps of:
    a) introducing a fuel gas stream comprising a gaseous fuel and an inert gas into one end of a counterflow diffusion flame burner having a top end and a bottom end;
    b) incorporating one or more ceramic oxide precursors into an oxidizing gas stream comprising $O_2$ and an inert gas, the ceramic oxide precursors being volatile metal compounds which upon combustion form ceramic oxide powder;
    c) introducing the oxidizing gas stream containing one or more ceramic oxide precursors into the other end of the counterflow diffusion flame burner; and
    d) generating a flame in the region of the counterflow diffusion flame burner where the two opposed gas streams impinge whereby the ceramic oxide precursors are converted to ceramic oxide powder.

2. The process of claim 1 wherein the inert gas is selected from the group consisting of $N_2$, He, Ne, At, Kr, Xe, and mixtures thereof.

3. The process of claim 2 wherein the gaseous fuel is selected from the group consisting of $H_2$, methane, ethane, ethylene, acetylene, and mixtures thereof.

4. The process of claim 3 wherein the oxidizing stream is air.

5. The process of claim 1 wherein the flame temperature range is about 300K. to about 3000K.

6. A process for the formation of a ceramic oxide powder, comprising the steps of:
    a) incorporating one or more ceramic oxide precursors into a fuel gas stream comprising a gaseous fuel and an inert gas, the ceramic oxide precursors being volatile metal compounds which upon combustion form ceramic oxide powder;
    b) incorporating one or more ceramic oxide precursors into an oxidizing gas stream comprising $O_2$ and an inert gas, the ceramic oxide precursors being volatile metal compounds which upon combustion form ceramic oxide powder;
    c) introducing the fuel gas stream containing one or more ceramic oxide precursors into one end of a counterflow diffusion flame burner having a top end and a bottom end;
    d) introducing the oxidizing gas stream containing one or more ceramic oxide precursors into the other end of the counterflow diffusion flame burner; and
    e) generating a flame in the region of the counterflow diffusion flame burner where the two opposed gas streams impinge whereby the ceramic oxide precursors are converted to ceramic oxide powder.

7. The process of claim 6 wherein the inert gas is selected from the group consisting of $N_2$, He, Ne, At, Kr, Xe, and mixtures thereof.

8. The process of claim 7 wherein the gaseous fuel is selected from the group consisting of $H_2$, methane, ethane, ethylene, acetylene, and mixtures thereof.

9. The process of claim 8 wherein the oxidizing stream is air.

10. The process of claim 6 wherein the flame temperature range is about 300K. to about 3000K.

* * * * *